US011985636B2

United States Patent
Yang et al.

(10) Patent No.: US 11,985,636 B2
(45) Date of Patent: May 14, 2024

(54) MULTIPLEXING OF SUB-SLOT BASED HYBRID AUTOMATIC REPEAT REQUEST ACKNOWLEDGEMENT AND SLOT BASED CHANNEL STATE INFORMATION

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 17/447,535

(22) Filed: Sep. 13, 2021

(65) Prior Publication Data

US 2022/0086831 A1    Mar. 17, 2022

Related U.S. Application Data

(60) Provisional application No. 63/077,939, filed on Sep. 14, 2020.

(51) Int. Cl.
*H04W 72/0446* (2023.01)
*H04L 1/1812* (2023.01)
(Continued)

(52) U.S. Cl.
CPC ....... *H04W 72/0446* (2013.01); *H04L 1/1812* (2013.01); *H04L 5/0053* (2013.01); *H04W 72/21* (2023.01)

(58) Field of Classification Search
CPC .............. H04W 72/0446; H04W 72/21; H04L 1/1812; H04L 5/0053; H04L 5/0055;
(Continued)

(56) References Cited

U.S. PATENT DOCUMENTS

2017/0041923 A1\* 2/2017 Park ................. H04L 5/0053
2019/0356455 A1\* 11/2019 Yang ................. H04L 5/0055
2021/0391955 A1\* 12/2021 He .................... H04L 5/0055

FOREIGN PATENT DOCUMENTS

WO    WO-2019192017 A1    10/2019

OTHER PUBLICATIONS

HUAWEI., et al., "Clarification on UCI Multiplexing on PUSCH", 3GPP TSG RAN WG1 Meeting #101-e, 3GPP Draft, R1-2004614, 3rd Generation Partnership Project (3GPP), Mobile Competence Centre, 650, Route Des Lucioles, F-06921 Sophia-Antipolis Cedex, France, vol. RAN WG1, No. E-meeting, May 25, 2020-Jun. 5, 2020, May 16, 2020 (May 16, 2020), 3 Pages, XP051886330, Retrieved from the Internet: URL: https://ftp.3gpp.org/tsg_ran/WG1_RL1/TSGR1_101-e/Docs/R1-2004614.zip, R1-2004614.docx [retrieved on May 16, 2020], The whole document.
(Continued)

*Primary Examiner* — Charles C Jiang
*Assistant Examiner* — Debebe A Asefa
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a downlink communication. The UE may receive a configuration identifying a first uplink resource for a hybrid automatic repeat request acknowledgement (HARQ-ACK) and a second uplink resource for multiplexing channel state information (CSI) reports. The UE may receive a downlink communication. The UE may determine that a HARQ-ACK for the downlink communication is to be multiplexed with one or more CSI reports on the second uplink resource. The UE may determine that an error has occurred based at least in part on a determination that the second uplink resource configured is in a different sub-slot
(Continued)

than the first uplink resource. Numerous other aspects are provided.

30 Claims, 13 Drawing Sheets

(51) Int. Cl.
*H04L 5/00* (2006.01)
*H04W 72/21* (2023.01)

(58) Field of Classification Search
CPC ... H04L 5/0057; H04L 1/1861; H04L 1/1671; H04L 1/1854; H04L 1/1864; H04L 5/0094
See application file for complete search history.

(56) References Cited

OTHER PUBLICATIONS

International Search Report and Written Opinion—PCT/US2021/071450—ISA/EPO—dated Jan. 7, 2022.

* cited by examiner

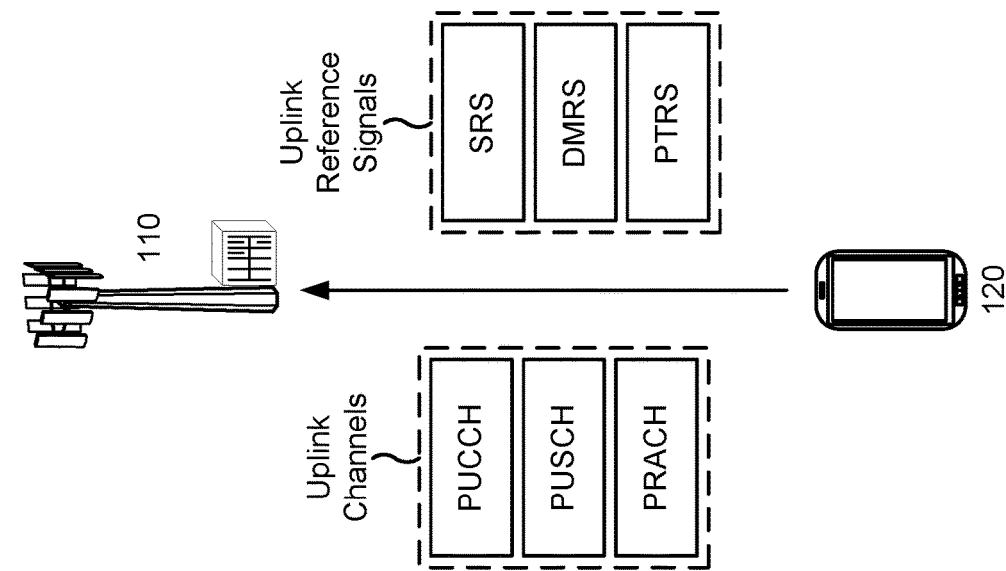
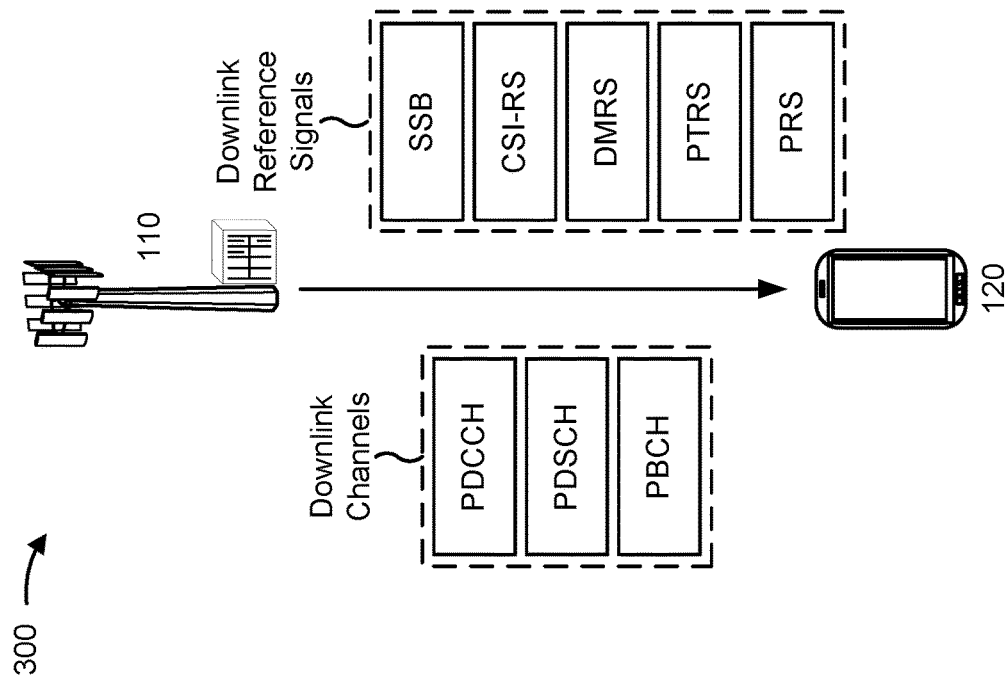
FIG. 3

MULTIPLEXING OF SUB-SLOT BASED HYBRID AUTOMATIC REPEAT REQUEST ACKNOWLEDGEMENT AND SLOT BASED CHANNEL STATE INFORMATION

CROSS-REFERENCE TO RELATED APPLICATION

This patent application claims priority to U.S. Provisional Patent Application No. 63/077,939, filed on Sep. 14, 2020, entitled "MULTIPLEXING OF SUB-SLOT BASED HYBRID AUTOMATIC REPEAT REQUEST ACKNOWLEDGEMENT AND SLOT BASED CHANNEL STATE INFORMATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for multiplexing of a sub-slot based hybrid automatic repeat request acknowledgement (HARQ-ACK) and slot based channel state information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors coupled to the memory, the one or more processors configured to: receive a configuration identifying, for at least a time slot, a first uplink resource for a hybrid automatic repeat request acknowledgement (HARQ-ACK) and a second uplink resource for multiplexing channel state information (CSI) reports; receive a downlink communication; determine that a HARQ-ACK for the downlink communication is to be multiplexed with one or more CSI reports on the second uplink resource configured for the time slot; determine whether the second uplink resource configured for the time slot is in a different sub-slot than the first uplink resource configured for the time slot; and transmit the HARQ-ACK for the downlink communication multiplexed with the one or more CSI reports on the second uplink resource based at least in part on a determination that the second uplink resource configured for the time slot is in a same sub-slot as the first uplink resource configured for the time slot, or determine that an error has occurred based at least in part on a determination that the second uplink resource configured for the time slot is in a different sub-slot than the first uplink resource configured for the time slot.

In some aspects, a UE for wireless communication includes a memory and one or more processors coupled to the memory, the one or more processors configured to: receive a configuration identifying, for at least a time slot, a first uplink resource for a HARQ-ACK and a second uplink resource for multiplexing CSI reports; receive a downlink communication; and determine that a HARQ-ACK for the downlink communication is to be multiplexed with one or more CSI reports on the second uplink resource configured for the time slot, wherein the second uplink resource configured for the time slot is required to be in a same sub-slot as the first uplink resource configured for the time slot.

In some aspects, a base station for wireless communication includes a memory and one or more processors coupled to the memory, the one or more processors configured to: transmit, to a UE, a configuration identifying, for at least one time slot, a first uplink resource for a HARQ-ACK and a second uplink resource for multiplexing CSI reports, wherein the first uplink resource and the second uplink resource are required to be in a same sub-slot; transmit, to the UE, a downlink communication; and receive, from the UE, a HARQ-ACK for the downlink communication multiplexed with one or more CSI reports on the second uplink resource.

In some aspects, a method of wireless communication performed by a UE includes receiving a configuration identifying, for at least a time slot, a first uplink resource for a HARQ-ACK and a second uplink resource for multiplexing CSI reports; receiving a downlink communication; determining that a HARQ-ACK for the downlink communication is to be multiplexed with one or more CSI reports on the second uplink resource configured for the time slot; determining whether the second uplink resource configured for the time slot is in a different sub-slot than the first uplink resource configured for the time slot; and transmitting the HARQ-ACK for the downlink communication multiplexed with the one or more CSI reports on the second uplink resource based at least in part on a determination that the second uplink resource configured for the time slot is in a same sub-slot as the first uplink resource configured for the time slot, or determining that an error has occurred based at least in part on a determination that the second uplink resource configured for the time slot is in a different sub-slot than the first uplink resource configured for the time slot.

In some aspects, a method of wireless communication performed by a UE includes receiving a configuration identifying, for at least a time slot, a first uplink resource for a HARQ-ACK and a second uplink resource for multiplexing CSI reports; receiving a downlink communication; and determining that a HARQ-ACK for the downlink communication is to be multiplexed with one or more CSI reports on the second uplink resource configured for the time slot, wherein the second uplink resource configured for the time slot is required to be in a same sub-slot as the first uplink resource configured for the time slot.

In some aspects, a method of wireless communication performed by a base station includes transmitting, to a UE, a configuration identifying, for at least one time slot, a first uplink resource for a HARQ-ACK and a second uplink resource for multiplexing CSI reports, wherein the first uplink resource and the second uplink resource are required to be in a same sub-slot; transmitting, to the UE, a downlink communication; and receiving, from the UE, a HARQ-ACK for the downlink communication multiplexed with one or more CSI reports on the second uplink resource.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of physical channels and reference signals in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
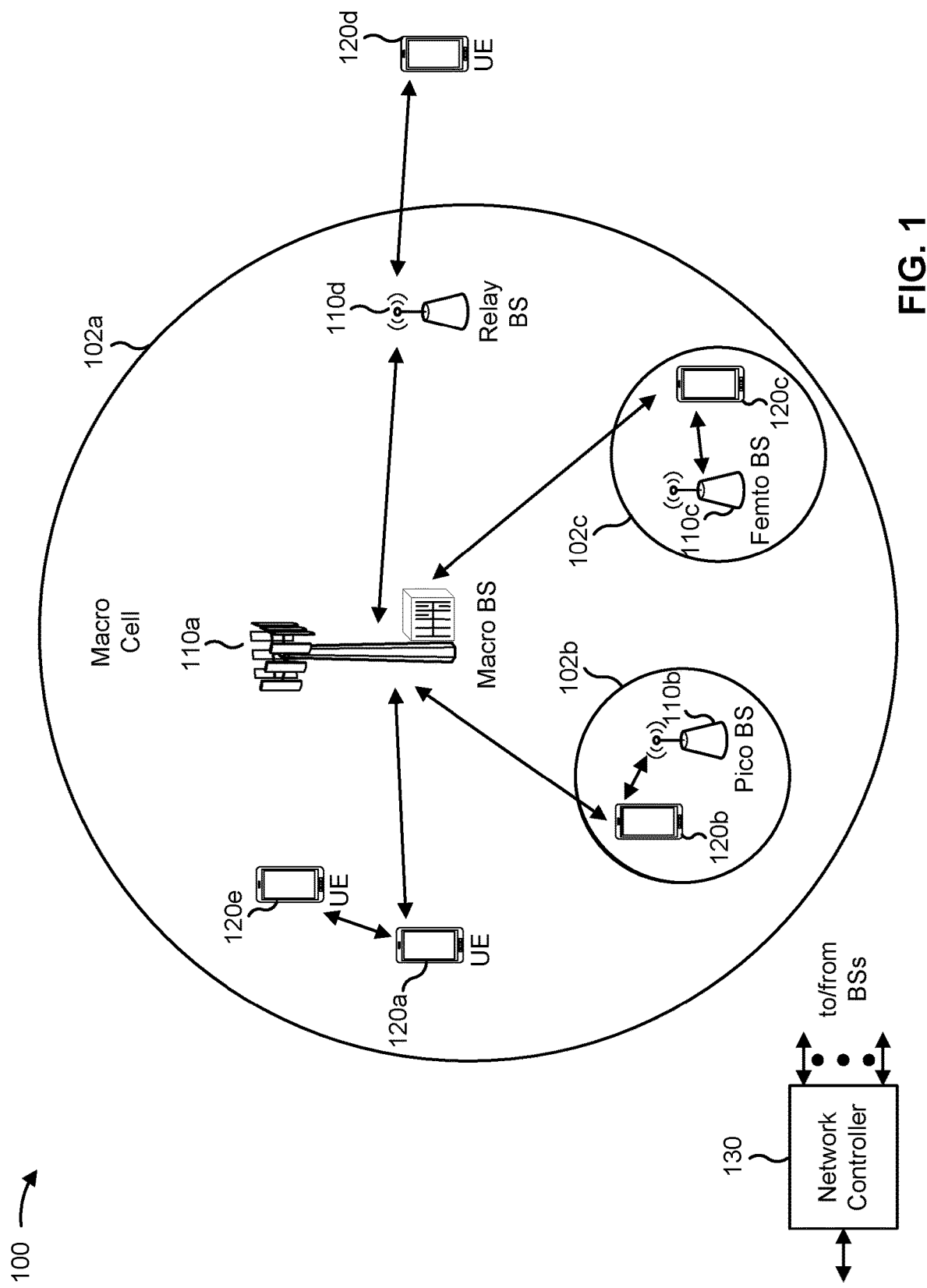
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
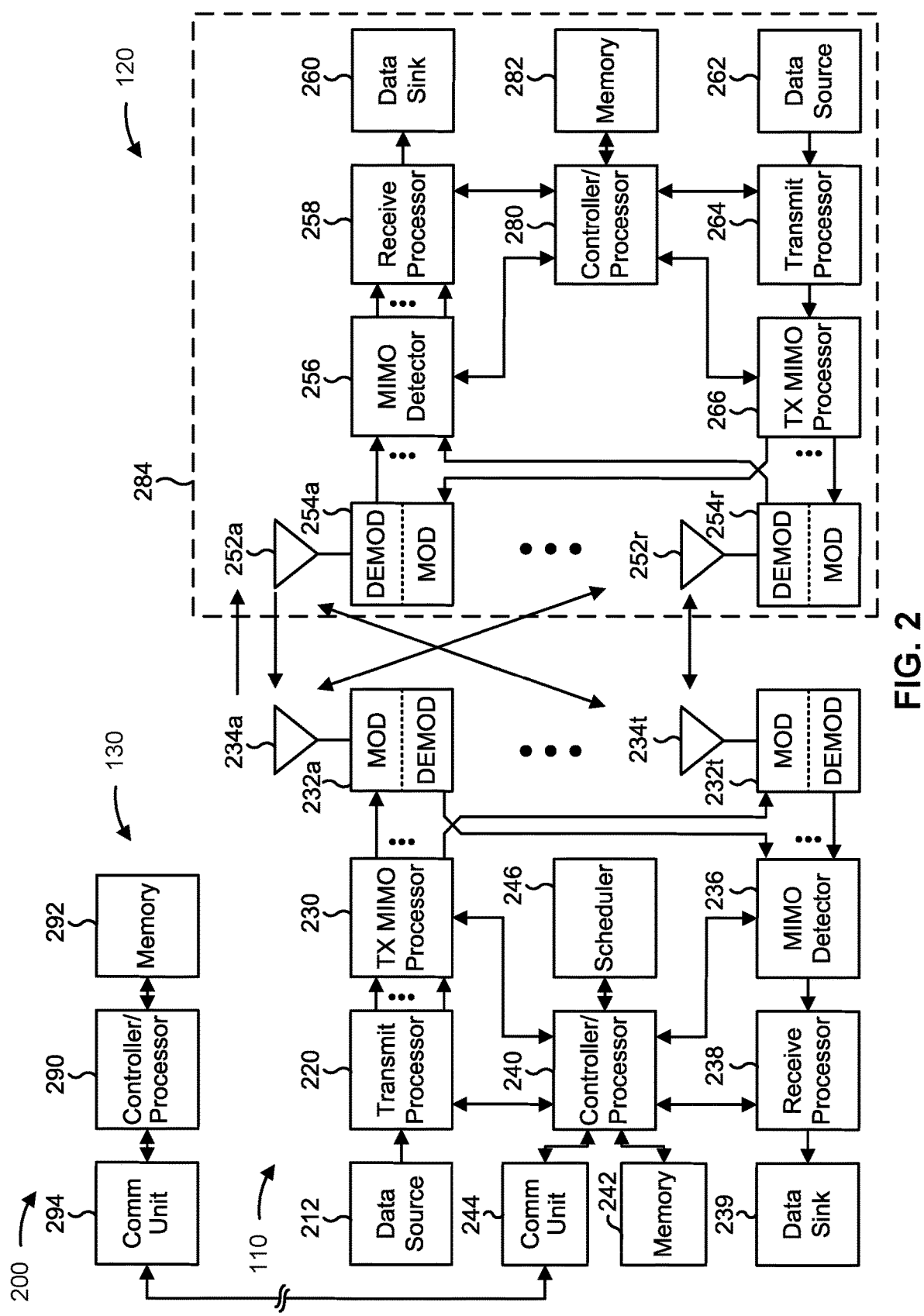
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with multiplexing of a sub-slot based hybrid automatic repeat request acknowledgement (HARQ-ACK) and slot based channel state information, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for receiving a downlink communication; means for determining that one or more channel state information (CSI) reports are scheduled to be transmitted in a same time slot as a first uplink resource for a hybrid automatic repeat request acknowledgement (HARQ-ACK) for the downlink communication; means for determining whether a second uplink resource for multiplexing the one or more CSI reports is in a same sub-slot as the first uplink resource; and/or means for transmitting the HARQ-ACK for the downlink communication on the first uplink resource in connection with a determination that the second uplink resource is not in the same sub-slot as the first uplink resource. The means for the UE 120 to perform operations described herein may include, for example, antenna 252, modem 254, MIMO detector 256, receive processor 258, transmit processor 264, TX MIMO processor 266, controller/processor 280, and/or memory 282.

In some aspects, the UE 120 includes means for transmitting the HARQ-ACK for the downlink communication on the first uplink resource without multiplexing the HARQ-ACK for the downlink communication with the one or more CSI reports. In some aspects, the UE 120 includes means for transmitting the HARQ-ACK for the downlink communication on the first uplink resource without transmitting the one or more CSI reports in a sub-slot of the same time slot as the first uplink resource.

In some aspects, the UE 120 includes means for transmitting the HARQ-ACK for the downlink communication on the first uplink resource in a first sub-slot. In some aspects, the UE 120 includes means for multiplexing the one or more CSI reports on the second uplink resource; and/or means for transmitting the one or more CSI reports multiplexed on the second uplink resource in a second sub-slot. In some aspects, the UE 120 includes means for multiplexing the HARQ-ACK with the one or more CSI reports on the second uplink resource in connection with a determination that the second uplink resource is in the same sub-slot as the first uplink resource. In some aspects, the UE 120 includes means for receiving a configuration identifying the first uplink resource and the second uplink resource.

In some aspects, the UE 120 includes means for receiving a configuration identifying, for at least a first time slot, a first uplink resource for a HARQ-ACK and a second uplink resource for multiplexing CSI reports; means for receiving a downlink communication; means for determining that a HARQ-ACK for the downlink communication is to be multiplexed with one or more CSI reports that are scheduled to be transmitted in a first time slot on the second uplink resource configured for the first time slot; means for determining whether the second uplink resource configured for the first time slot is in a different sub-slot than the first uplink resource configured for the first time slot; means for transmitting the HARQ-ACK for the downlink communication multiplexed with the one or more CSI reports on the second uplink resource based at least in part on a determination that the second uplink resource configured for the time slot is in a same sub-slot as the first uplink resource configured for the time slot; and/or means for determining that an error has occurred based at least in part on a determination that the second uplink resource configured for the time slot is in a different sub-slot than the first uplink resource configured for the time slot. The means for the UE 120 to perform operations described herein may include, for example, antenna 252, modem 254, MIMO detector 256, receive processor 258, transmit processor 264, TX MIMO processor 266, controller/processor 280, and/or memory 282.

In some aspects, the UE 120 includes means for determining that multiplexing the HARQ-ACK with the one or more CSI reports on the second uplink resource moves the HARQ-ACK from a first sub-slot to a second sub-slot. In some aspects, the UE 120 includes means for transmitting the HARQ-ACK for the downlink communication multiplexed with one or more CSI reports on the second uplink resource based at least in part on a determination that the second uplink resource configured for the first time slot is in a same sub-slot as the first uplink resource configured for the first time slot.

In some aspects, the UE 120 includes means for receiving a configuration identifying, for at least a first time slot, a first uplink resource for a HARQ-ACK and a second uplink resource for multiplexing CSI reports; means for receiving a downlink communication; and/or means for determining that a HARQ-ACK for the downlink communication is to be multiplexed with one or more CSI reports that are scheduled to be transmitted in the first time slot on the second uplink resource configured for the first time slot, wherein the second uplink resource configured for the first time slot is required to be in a same sub-slot as the first uplink resource configured for the first time slot. The means for the UE 120 to perform operations described herein may include, for example, antenna 252, modem 254, MIMO detector 256, receive processor 258, transmit processor 264, TX MIMO processor 266, controller/processor 280, and/or memory 282.

In some aspects, the base station 110 includes means for transmitting, to a UE, a configuration identifying, for at least one time slot, a first uplink resource for a HARQ-ACK and a second uplink resource for multiplexing CSI reports, wherein the first uplink resource and the second uplink resource are required to be in a same sub-slot; means for transmitting, to the UE, a downlink communication; and/or means for receiving, from the UE, a HARQ-ACK for the downlink communication multiplexed with one or more CSI reports on the second uplink resource. The means for the base station 110 to perform operations described herein may include, for example, transmit processor 220, TX MIMO processor 230, modem 232, antenna 234, MIMO detector 236, receive processor 238, controller/processor 240, memory 242, and/or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some examples, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some examples, the UE 120 may transmit acknowledgement (ACK) or negative acknowledgement (NACK) feedback (e.g., ACK/NACK feedback or ACK/NACK information) in UCI on the PUCCH and/or the PUSCH. For example, the UE 120 may transmit a hybrid automatic repeat request ACK (HARQ-ACK) or a hybrid automatic repeat request NACK (HARQ-NACK) on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
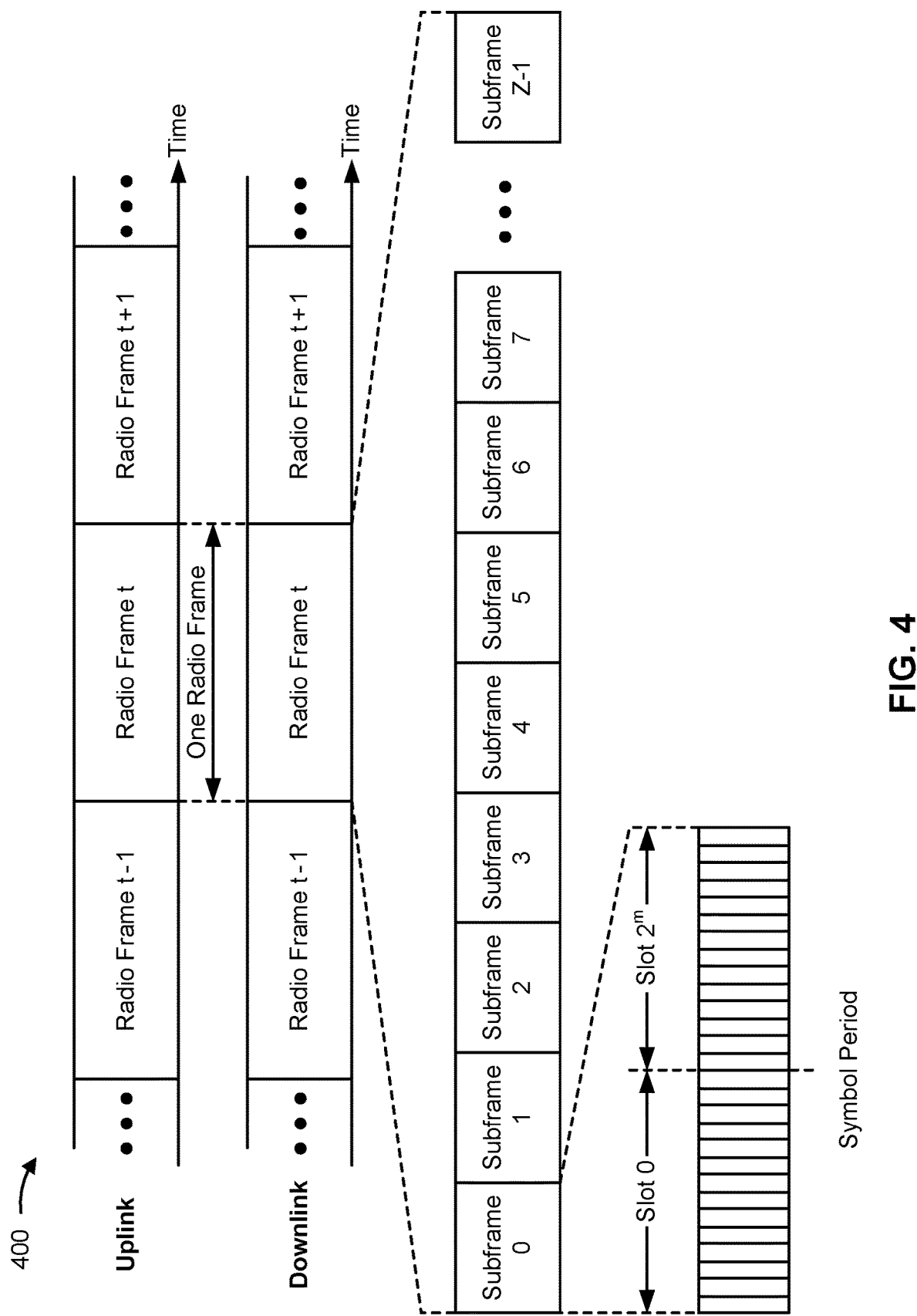
FIG. 4 is a diagram illustrating an example of a frame structure in a wireless communication network, in accordance with the present disclosure.

FIG. 4 is a diagram illustrating an example 400 of a frame structure in a wireless communication network, in accordance with the present disclosure. The frame structure shown in FIG. 4 is for frequency division duplexing (FDD) in a telecommunication system, such as LTE, NR, or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 4, where m is an index of a numerology used for a transmission, such as 0, 1, 2, 3, 4, or the like). Each slot may include a set of L symbol periods. For example, each slot may include fourteen symbol periods (e.g., as shown in FIG. 4), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, symbol-based, or the like.

As indicated above, FIG. 4 is provided as an example. Other examples may differ from what is described with respect to FIG. 4.

In order to ensure reliability of downlink communications, a UE may send, to a base station, a HARQ-ACK for a downlink communication (e.g., PDSCH communication). The HARQ-ACK may be a single bit transmitted in a PUCCH communication. Sub-slot based HARQ-ACK reporting may be used to reduce the latency of HARQ-ACK reporting. In sub-slot based HARQ-ACK reporting, a slot may be divided into a number of sub-slots (e.g., 2 or 7 sub-slots), and a HARQ-ACK may be transmitted using sub-slot based transmission. HARQ-ACKs for semi-persistent scheduling (SPS) PDSCH communications may be transmitted in a PUCCH resource configured for the UE (e.g., via radio resource control (RRC) configuration).

In a case in which sub-slot based HARQ-ACK reporting is used, CSI reports and scheduling requests (SRs) (with the same priority as the sub-slot based HARQ-ACK report) may be transmitted using slot-based transmission. In this case, PUCCH resources for transmitting CSI reports and/or SRs in a slot may be restricted to be within the sub-slots of the slot. When a HARQ-ACK for an SPS PDSCH communication collides with a CSI report on the PUCCH, the UE may multiplex the HARQ-ACK for the SPS PDSCH communication with the CSI report on a PUCCH resource configured for the CSI report.

Figure 5:
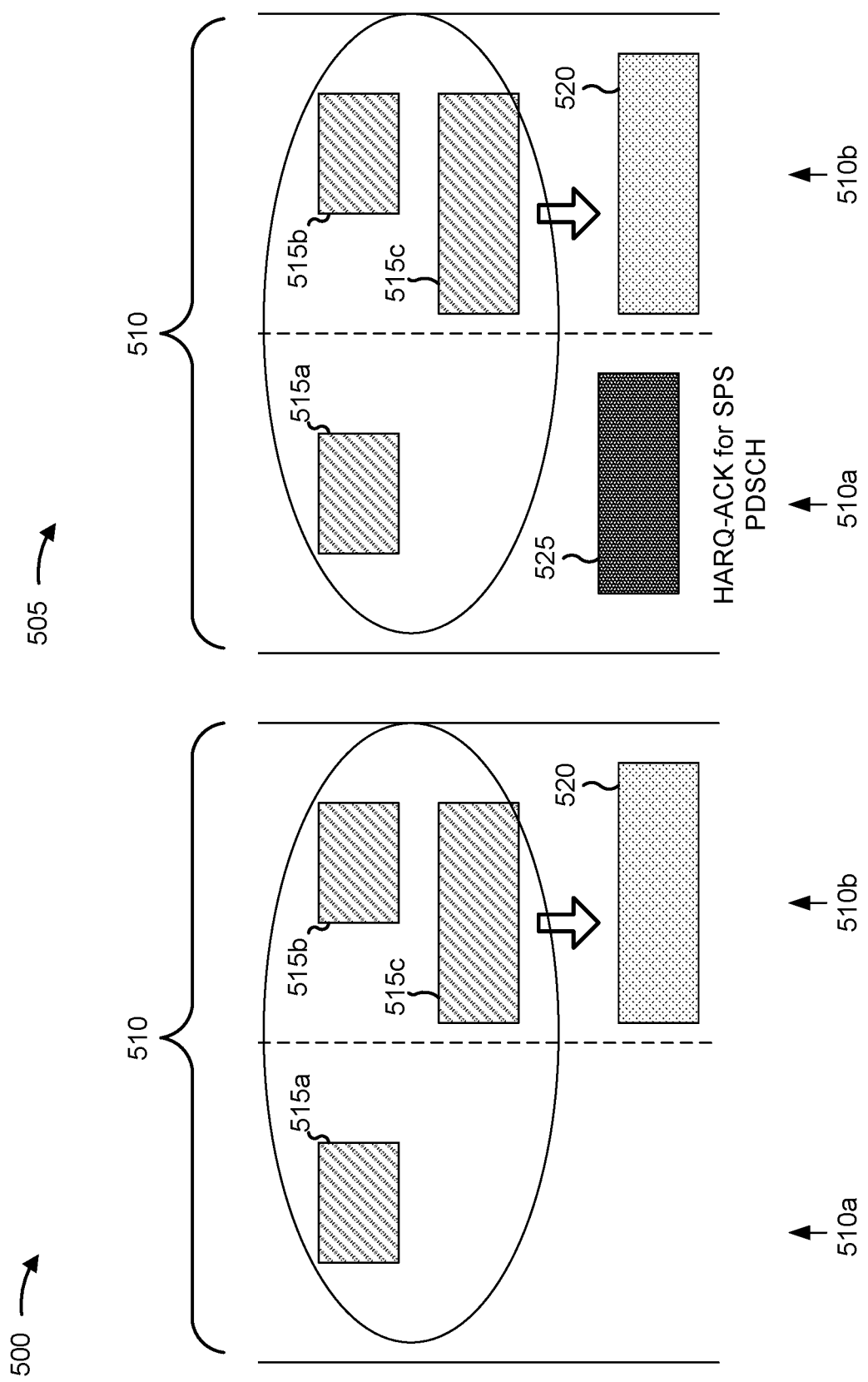
FIG. 5 is a diagram illustrating examples of multiplexing channel state information (CSI) reports into an uplink resource, in accordance with the present disclosure.

FIG. 5 is a diagram illustrating examples 500 and 505 of multiplexing CSI reports into an uplink resource, in accordance with the present disclosure.

As shown in example 500, CSI reports 515a, 515b, and 515c may be scheduled to be transmitted in a slot 510. The slot 510 may include a first sub-slot 510a and a second sub-slot 510b. The UE may be configured with a list (e.g., multi-CSI-PUCCH-resourceList) of one or more PUCCH resources for transmitting multiplexed CSI reports. In this case, when multiple CSI reports 515a, 515b, and 515c are scheduled in the same time slot 510 and at least two PUCCHs are overlapping in time, the UE may multiplex all of the CSI reports 515a, 515b, and 515c scheduled in the time slot 510 into a single PUCCH communication and transmit the PUCCH communication including the multiplexed CSI reports on a PUCCH resource 520 from the configured list of PUCCH resources. The UE may also multiplex other UCI in the same slot 510 with the CSI reports 515a, 515b, and 515c on the PUCCH resource 520. The UE may be configured to restrict the PUCCH resources (e.g., PUCCH resource 520) to a sub-slot (e.g., the second sub-slot 510b). For example, in some cases, if a UE is configured with "subslotLengthForPUCCH" in the PUCCH configuration, then all PUCCH resources shall be restricted to a subslot.

As shown in example 505, the UE may be configured to report a HARQ-ACK 525 for an SPS PDSCH in the first sub-slot 510a. As described above, when a HARQ-ACK for an SPS PDSCH communication collides with a CSI report on the PUCCH, the UE may multiplex the HARQ-ACK for the SPS PDSCH communication with the CSI report. In example 505, the HARQ-ACK collides/overlaps in time with the CSI report 515a. Because the HARQ-ACK 525 for the SPS PDSCH is scheduled to be transmitted in the same slot 510 as the CSI reports 515a, 515b, and 515c, the UE may multiplex the HARQ-ACK 525 with the CSI reports 515a, 515b, and 515c on the PUCCH resource 520. This may result in the HARQ-ACK 525 being transmitted in the second sub-slot 510b instead of the first sub-slot 510a, which will result in increased latency for the HARQ-ACK 525.

When one or more CSI reports are scheduled to be transmitted by a UE in the same slot as a HARQ-ACK for a downlink communication, the UE may multiplex the HARQ-ACK with the CSI reports on a PUCCH resource configured for multiplexing the CSI reports. This may cause the HARQ-ACK to be transmitted in an incorrect sub-slot, which may increase the latency of the HARQ-reporting. Furthermore, this may cause confusion if other HARQ-ACKs (that are associated with the same priority index) are scheduled to be transmit in the sub-slot associated with the PUCCH resource configured for multiplexing the CSI reports, leading to decreased reliability of the HARQ-reporting.

Some techniques and apparatuses described herein enable a UE to determine that one or more CSI reports are scheduled to be transmitted in the same slot as a HARQ-ACK for a downlink communication, determine whether an uplink resource configured for multiplexing the CSI reports is in a same sub-slot as an uplink resource for the HARQ-ACK, and transmit the HARQ-ACK on the uplink resource for the HARQ-ACK without multiplexing the HARQ-ACK with the CSI reports based at least in part on a determination that the uplink resource configured for multiplexing the CSI reports is not in the same sub-slot as the uplink resource for the HARQ-ACK. As a result, the UE may refrain from moving the HARQ-ACK to a different sub-slot to be multiplexed with the CSI reports, which improves latency and improves reliability for HARQ-ACK reporting.

Some techniques and apparatuses described herein enable a UE to receive a configuration identifying a first uplink resource for a HARQ-ACK and a second uplink resource for multiplexing CSI reports. The UE may receive a downlink communication, and the UE may determine that a HARQ-ACK for the downlink communication is to be multiplexed with one or more CSI reports on the second uplink resource. In some aspects, the second uplink resource may be required to be in the same sub-slot as the first uplink resource. In some aspects, the UE may determine that an error has occurred based at least in part on a determination that the second uplink resource is in a different sub-slot than the first uplink resource. As a result, the UE may refrain from moving the HARQ-ACK to a different sub-slot to be multiplexed with the CSI reports, which improves latency and improves reliability for HARQ-ACK reporting.

As indicated above, FIG. 5 is provided as an example. Other examples may differ from what is described with respect to FIG. 5.

Figure 6:
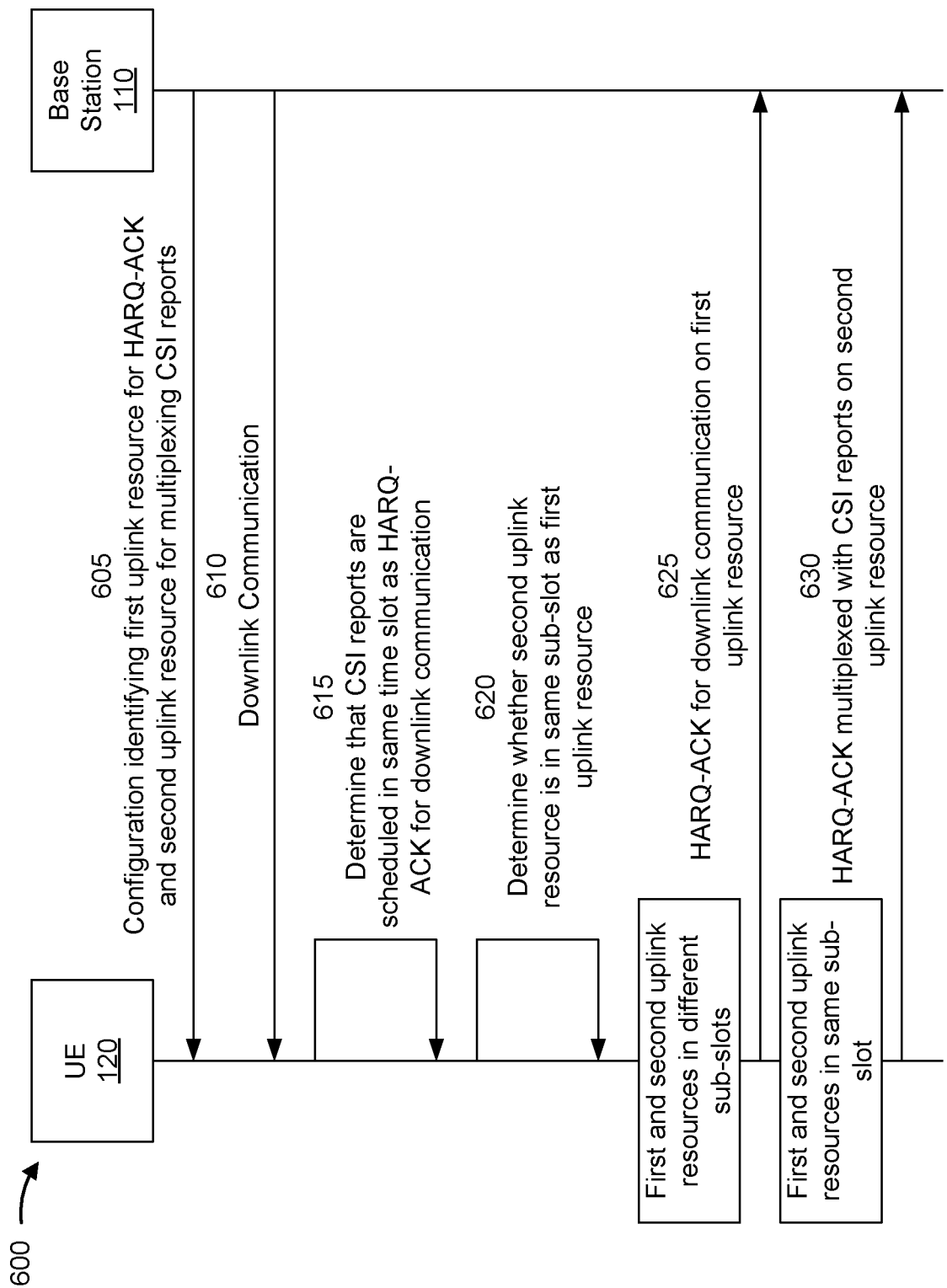
FIGS. 6-7 are diagrams illustrating examples associated with multiplexing of a sub-slot based hybrid automatic repeat request acknowledgement (HARQ-ACK) and slot based CSI, in accordance with the present disclosure.

FIG. 6 is a diagram illustrating an example 600 associated with multiplexing of a sub-slot based HARQ-ACK and slot based CSI, in accordance with the present disclosure. As shown in FIG. 6, example 600 includes communication between a base station 110 and a UE 120. In some aspects, base station 110 and UE 120 may be included in a wireless network, such as wireless network 100. Base station 110 and UE 120 may communicate on a wireless access link, which may include an uplink and a downlink.

As shown in FIG. 6, and by reference number 605, the base station 110 may transmit, to the UE 120, a configuration identifying a first uplink resource for a HARQ-ACK and a second uplink resource for multiplexing CSI reports. For example, the configuration may be included in an RRC communication, DCI, or a medium access control (MAC) control element (MAC-CE). The configuration may identify, for each of one or more time slots, a respective first uplink resource for the HARQ-ACK and a respective second uplink resource for multiplexing CSI reports.

In some aspects, the first uplink resource may be a first PUCCH resource for transmitting a HARQ-ACK for a downlink communication. For example, the first uplink resource may be a PUCCH resource configured for transmitting a HARQ-ACK for an SPS PDSCH communication. The second uplink resource may be a second PUCCH resource configured for transmitting multiplexed CSI reports.

As further shown in FIG. 6, and by reference number 610, the base station 110 may transmit a downlink communication to the UE 120, and the UE 120 may receive the downlink communication. For example, the downlink communication may be an SPS PDSCH communication.

As further shown in FIG. 6, and by reference number 615, the UE 120 may determine that one or more CSI reports are scheduled to be transmitted in a same time slot as a HARQ-ACK for the downlink communication received by the UE 120. The HARQ-ACK for the downlink communication may be scheduled to be transmitted on the first uplink resource in a first sub-slot of the slot. As used herein, the "first sub-slot" refers to the particular sub-slot associated with the first uplink resource for transmitting the HARQ-ACK for the downlink communication.

As further shown in FIG. 6, and by reference number 620, the UE 120 may determine whether the second uplink resource for multiplexing the CSI reports is in a same sub-slot (e.g., the first sub-slot) as the first uplink resource for the HARQ-ACK for the downlink communication. The UE 120 may determine whether the second uplink resource is in the same sub-slot as the first uplink resource based at least in part on the determination that the CSI reports are scheduled in the same time slot as the HARQ-ACK for the downlink communication.

In some aspects, the UE 120 may multiplex the CSI reports into a PUCCH communication to be transmitted on the second uplink resource configured for the slot. The second uplink resource may be configured to be in a particular sub-slot of the slot. The UE 120 may then determine whether the second uplink resource is in the first sub-slot (e.g., the same sub-slot as the first uplink resource) or in a second sub-slot of the slot. As used herein, the "second sub-slot" may refer to any sub-slot of the slot other than the first sub-slot.

As further shown in FIG. 6, and by reference number 625, in connection with a determination that the first uplink resource and the second uplink resource are in different sub-slots, the UE 120 may transmit, to the base station 110, the HARQ-ACK for the downlink communication on the first uplink resource. In this case, the UE 120 may transmit the HARQ-ACK on the first resource in the first sub-slot without multiplexing the HARQ-ACK with the CSI reports.

In some aspects, when the first uplink resource and the second uplink resource are in different sub-slots, the UE 120 may transmit the HARQ-ACK for the downlink communication on the first uplink resource in the first sub-slot, and the UE 120 may not transmit the CSI reports in the slot. In some aspects, the UE 120 may drop the CSI reports and not transmit the CSI reports to the base station 110. In some aspects, the UE 120 may re-schedule the CSI reports to be transmitted in another slot.

In some aspects, when the first uplink resource and the second uplink resource are in different sub-slots, the UE 120 may transmit the HARQ-ACK to the base station 110 on the first uplink resource in the first sub-slot, and the UE 120 may transmit the multiplexed CSI reports to the base station 110 on the second uplink resource in the second sub-slot.

As further shown in FIG. 6, and by reference number 630, in connection with a determination that the first uplink resource and the second uplink resource are in the same sub-slot (e.g., the first sub-slot), the UE 120 may multiplex the HARQ-ACK for the downlink communication with the CSI reports and transmit the multiplexed HARQ-ACK and CSI reports to the base station 110 on the second uplink resource. In this case, the UE 120 may transmit the multiplexed HARQ-ACK and CSI reports for the downlink communication on the second uplink resource in the first sub-slot.

As described above in connection with FIG. 6, the UE 120 may determine that one or more CSI reports are scheduled to be transmitted in the same slot as a HARQ-ACK for a downlink communication, may determine whether an uplink resource configured for multiplexing the CSI reports is in a same sub-slot as an uplink resource for the HARQ-ACK, and may transmit the HARQ-ACK on the uplink resource for the HARQ-ACK without multiplexing the HARQ-ACK with the CSI reports based at least in part on a determination that the uplink resource configured for multiplexing the CSI reports is not in the same sub-slot as the uplink resource for the HARQ-ACK. As a result, the UE 120 may refrain from moving the HARQ-ACK to a different sub-slot to be multiplexed with the CSI reports, thereby improving latency and reliability for HARQ-ACK reporting relative to moving the HARQ-ACK to the different sub-slot to be multiplexed with the CSI reports.

As indicated above, FIG. 6 is provided as an example. Other examples may differ from what is described with respect to FIG. 6.

Figure 7:
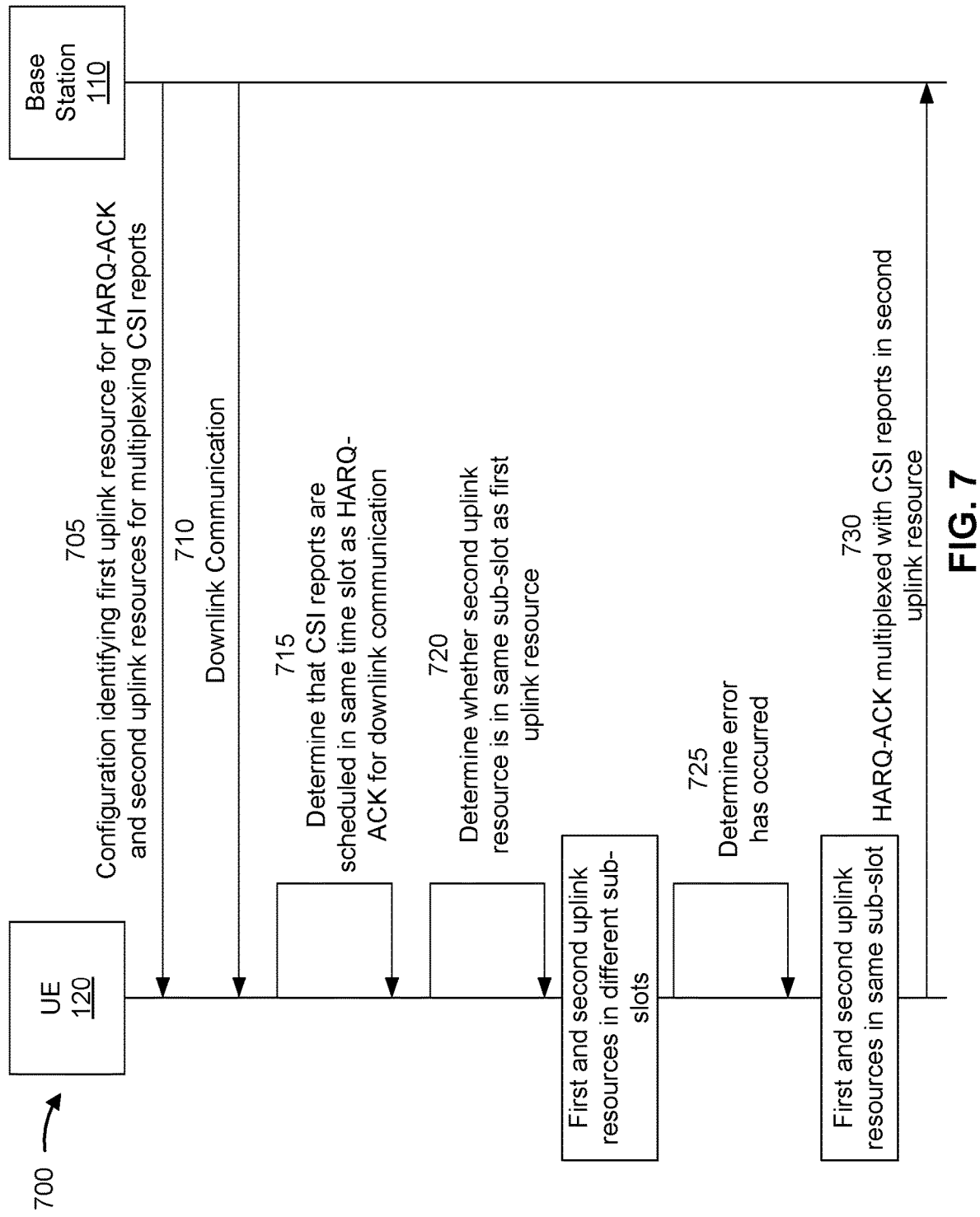

FIG. 7 is a diagram illustrating an example 700 associated with multiplexing of a sub-slot based HARQ-ACK and slot based CSI, in accordance with the present disclosure. As shown in FIG. 7, example 700 includes communication between a base station 110 and a UE 120. In some aspects, base station 110 and UE 120 may be included in a wireless network, such as wireless network 100. Base station 110 and UE 120 may communicate on a wireless access link, which may include an uplink and a downlink.

As shown in FIG. 7, and by reference number 705, the base station 110 may transmit, to the UE 120, a configuration identifying a first uplink resource for a HARQ-ACK and a second uplink resource for multiplexing CSI reports. For example, the configuration may be included in an RRC communication, DCI, or a MAC-CE. The configuration may identify, for each of one or more time slots, a respective first uplink resource for the HARQ-ACK and a respective second uplink resource for multiplexing CSI reports.

In some aspects, the first uplink resource may be a first PUCCH resource for transmitting a HARQ-ACK for a downlink communication. For example, the first uplink resource may be a PUCCH resource configured for transmitting a HARQ-ACK for an SPS PDSCH communication. The second uplink resource may be a second PUCCH resource configured for transmitting multiplexed CSI reports.

In some aspects, the base station 110 may generate the configuration to configure the second resource for multiplexing the CSI reports to be in a same sub-slot as the first resource for the HARQ-ACK in one or more time slots. This may allow the UE 120 to multiplex the HARQ-ACK with CSI reports scheduled in the same slot without moving the HARQ-ACK to a different time slot than the time slot associated with the first uplink resource. In some aspects, the UE 120 may be configured for sub-slot based HARQ-ACK reporting. In some aspects, the base station 110 may configure the second resource for multiplexing the CSI reports to be in the same sub-slot as the first resource for the HARQ-ACK in connection with the UE 120 being configured for sub-slot based HARQ-ACK reporting.

As further shown in FIG. 7, and by reference number 710, the base station 110 may transmit a downlink communication to the UE 120, and the UE 120 may receive the downlink communication. For example, the downlink communication may be an SPS PDSCH communication.

As further shown in FIG. 7, and by reference number 715, the UE 120 may determine that one or more CSI reports are scheduled to be transmitted in a same time slot as a HARQ-ACK for the downlink communication received by the UE 120. In some cases, the first uplink resource (e.g., PUCCH resource) for the HARQ-ACK for the downlink communication may collide/overlap in time with an uplink resource (e.g., a PUCCH resource) for at least one of the CSI reports scheduled to be transmitted in the same time slot. As described above, when the HARQ-ACK for the downlink communication collides with a CSI report on the PUCCH, the UE may determine that the HARQ-ACK for the downlink communication is to be multiplexed with the one or more CSI reports on the second uplink resource for multiplexing CSI reports. The HARQ-ACK for the downlink communication may be scheduled to be transmitted on the first uplink resource in a first sub-slot of the slot. As used herein, the "first sub-slot" refers to the particular sub-slot associated with the first uplink resource for transmitting the HARQ-ACK for the downlink communication.

As further shown in FIG. 7, and by reference number 720, the UE 120 may determine whether the second uplink resource for multiplexing the CSI reports is in a same sub-slot (e.g., the first sub-slot) as the first uplink resource for the HARQ-ACK for the downlink communication. The UE 120 may determine whether the second uplink resource is in the same sub-slot as the first uplink resource based at least in part on the determination that the CSI reports are scheduled in the same time slot as the HARQ-ACK for the downlink communication.

In some aspects, the UE 120 may determine whether multiplexing the HARQ-ACK for the downlink communication with the CSI reports on the second uplink resource moves the HARQ-ACK from the first sub-slot to a second sub-slot. As used herein, the "second sub-slot" may refer to any sub-slot of the slot other than the first sub-slot.

As further shown in FIG. 7, and by reference number 725, in connection with a determination that the first uplink resource and the second uplink resource are in different sub-slots, the UE 120 may determine that an error has occurred. That is, the UE 120 does not expect that, due to multiplexing with CSI reports or any other UCI type, the HARQ-ACK report (for the SPS PDSCH communication) in one sub-slot (e.g., the first sub-slot) is moved to another sub-slot (e.g., the second sub-slot). In other words, in some aspects, the base station 110 shall guarantee that the multiplexed PUCCH resource (e.g., the second uplink resource) lies in the same sub-slot as the PUCCH resource (e.g., the first uplink resource) originally scheduled to transmit the HARQ-ACK for the SPS PDSCH communication (e.g., the second uplink resource may be required to be scheduled in the same sub-slot as the first uplink resource). In a case in which the UE 120 determines that the first uplink resource and the second uplink resource are in different sub-slots, the UE 120 may treat this as an error case. For example, the UE 120 may determine that a configuration error and/or a scheduling error has occurred. In this case, in some aspects, the UE 120 may not transmit the HARQ-ACK and/or the CSI reports to the base station 110. That is, in some aspects, in connection with determining that multiplexing the HARQ-ACK with the CSI reports moves the HARQ-ACK from one sub-slot to another sub-slot, the UE may refrain from transmitting the HARQ-ACK (and/or refrain from transmitting the CSI reports). In some aspects, in connection with determining that multiplexing the HARQ-ACK with the CSI reports moves the HARQ-ACK from one sub-slot to another sub-slot, the UE may transmit the HARQ-ACK multiplexed with the CSI reports on the second uplink resource (e.g., in the second sub-slot). In some aspects, in connection with determining that multiplexing the HARQ-ACK with the CSI reports moves the HARQ-ACK from one sub-slot to another sub-slot, the UE may transmit the HARQ-ACK on the first uplink resource (e.g., in the first sub-slot).

In some aspects, the UE 120 may determine that the error has occurred in connection with the determination that the first uplink resource and the second uplink resource are in different sub-slots, in a case in which the UE 120 is configured for sub-slot based HARQ-ACK reporting. For example, the UE 120 being configured for sub-slot based HARQ-ACK reporting (e.g., the UE 120 being provided a subslotLengthforPUCCH for the HARQ-ACK codebook of a given priority) may be a pre-condition for detecting that the error has occurred in connection with the determination that the first uplink resource and the second uplink resource are in different sub-slots. That is, when the UE 120 is configured for sub-slot based HARQ-ACK reporting, the UE 120 does not expect that, due to multiplexing with CSI reports or any other UCI type, the HARQ-ACK report (for the SPS PDSCH communication) in one sub-slot (e.g., the first sub-slot) is moved to another sub-slot (e.g., the second sub-slot). In other words, in some aspects, the base station 110 shall guarantee that the multiplexed PUCCH resource (e.g., the second uplink resource) lies in the same sub-slot as the PUCCH resource (e.g., the first uplink resource) originally scheduled to transmit the HARQ-ACK for the SPS PDSCH communication (e.g., the second uplink resource may be required to be scheduled in the same sub-slot as the first uplink resource) in a case in which the UE 120 is configured for sub-slot based HARQ-ACK reporting. In this case, the UE 120 may determine that an error case has occurred based at least in part on a determination that the UE 120 is configured for sub-slot based HARQ-ACK reporting and based at least in part on the determination that the first uplink resource and the second uplink resource are in different sub-slots.

As further shown in FIG. 7, and by reference number 730, in connection with a determination that the first uplink resource and the second uplink resource are in the same sub-slot (e.g., the first sub-slot), the UE 120 may multiplex the HARQ-ACK for the downlink communication with the CSI reports and transmit the multiplexed HARQ-ACK and CSI reports to the base station 110 on the second uplink resource. In this case, the UE 120 may transmit the multiplexed HARQ-ACK and CSI reports for the downlink communication on the second uplink resource in the first sub-slot.

As described above in connection with FIG. 7, the UE 120 may determine that one or more CSI reports are scheduled to be transmitted in the same slot as a HARQ-ACK for a downlink communication, may determine whether an uplink resource configured for multiplexing the CSI reports is in a same sub-slot as an uplink resource for the HARQ-ACK, and may determine that an error has occurred based at least in part on a determination that the uplink resource configured for multiplexing the CSI reports is not in the same sub-slot as the uplink resource for the HARQ-ACK. As a result, the UE 120 may refrain from moving the HARQ-ACK to a different sub-slot to be multiplexed with the CSI reports, thereby improving latency and reliability for HARQ-ACK reporting relative to moving the HARQ-ACK to a different sub-slot to be multiplexed with the CSI reports.

Some techniques and apparatuses described herein enable a UE to receive a configuration identifying a first uplink resource for a HARQ-ACK and a second uplink resource for multiplexing CSI reports. The UE may receive a downlink communication, and the UE may determine that a HARQ-ACK for the downlink communication is to be multiplexed with one or more CSI reports on the second uplink resource. In some aspects, the second uplink resource may be required to be in the same sub-slot as the first uplink resource. In some aspects, the UE may determine that an error has occurred based at least in part on a determination that the second uplink resource is in a different sub-slot than the first uplink resource. As a result, the UE may refrain from moving the HARQ-ACK to a different sub-slot to be multiplexed with the CSI reports, which improves latency and improves reliability for HARQ-ACK reporting.

In some aspects, the techniques and operations described above in connection with FIG. 7 with respect to HARQ-ACK transmission may also be applied to transmission of SRs. For example, the UE 120 may be configured with a first uplink resource for transmitting an SR to the base station 110 and a second uplink resource for multiplexing CSI reports. The UE 120 may determine that the SR is to be multiplexed with the one or more CSI reports on the second uplink resource (e.g., due to the first uplink resource overlapping with an uplink resource for at least one of the CSI reports). In this case, the UE 120 may determine that an error case has occurred in connection with a determination that the SR is moved from one sub-slot to another sub-slot to be multiplexed with the CSI reports (e.g., in connection with a determination that the first uplink resource and the second uplink resource are in different sub-slots. That is, the UE 120 (e.g., when configured for sub-slot based HARQ reporting/SR transmission) may not expect that, due to multiplexing with CSI reports or any other UCI type, the SR in one sub-slot is moved to another sub-slot. In other words, in some aspects, the base station 110 shall guarantee that the multiplexed PUCCH resource (e.g., the second uplink resource) lies in the same sub-slot as the PUCCH resource (e.g., the first uplink resource) originally scheduled to transmit the SR (e.g., the second uplink resource may be required to be scheduled in the same sub-slot as the first uplink resource).

As indicated above, FIG. 7 is provided as an example. Other examples may differ from what is described with respect to FIG. 7.

Figure 8:
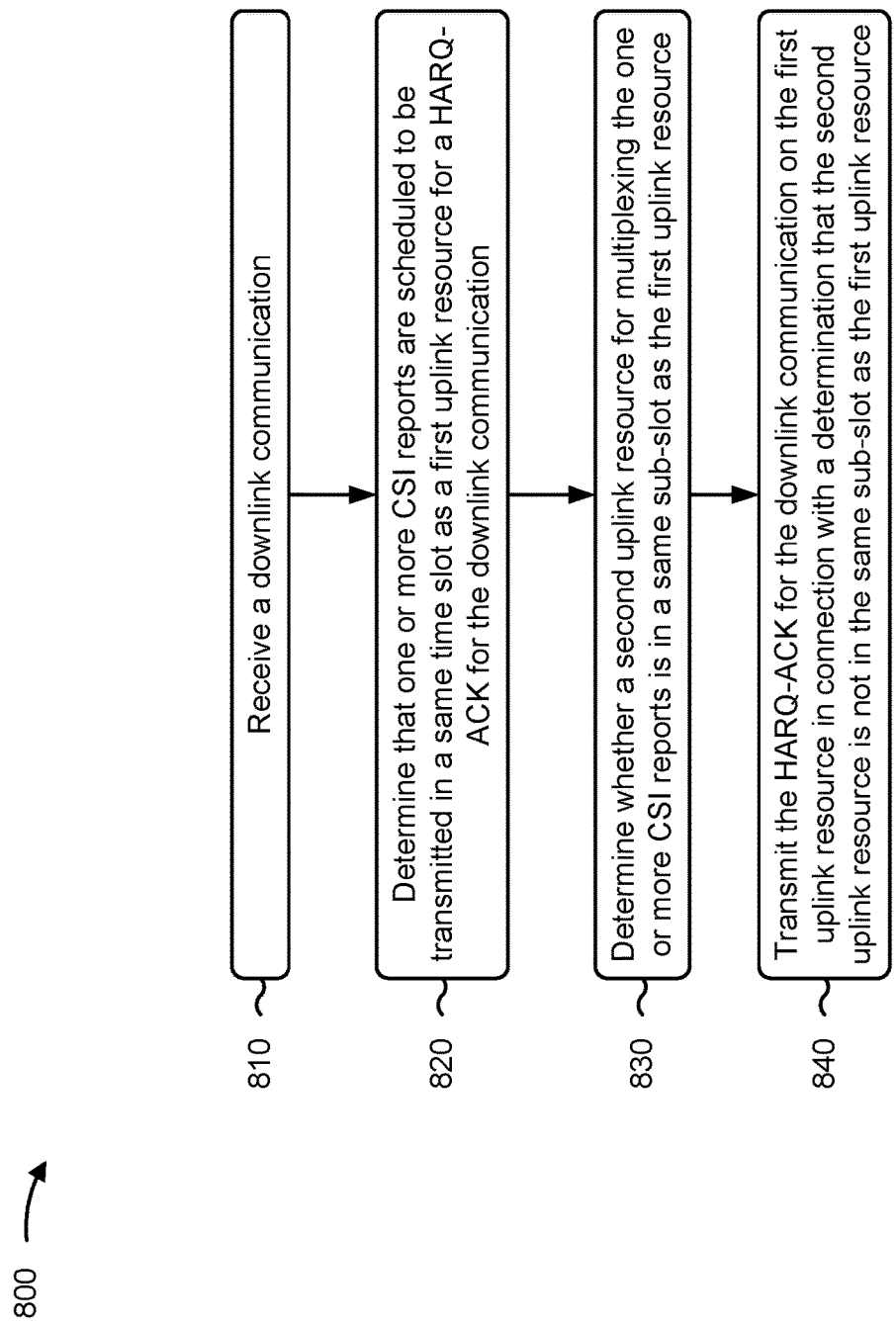
FIGS. 8-11 are diagrams illustrating example processes associated with multiplexing of a sub-slot based HARQ-ACK and slot based CSI, in accordance with the present disclosure.

FIG. 8 is a diagram illustrating an example process 800 performed, for example, by a UE, in accordance with the present disclosure. Example process 800 is an example where the UE (e.g., UE 120) performs operations associated with multiplexing of a sub-slot based HARQ-ACK and slot based CSI.

As shown in FIG. 8, in some aspects, process 800 may include receiving a downlink communication (block 810). For example, the UE (e.g., using reception component 1202, depicted in FIG. 12) may receive a downlink communication, as described above.

As further shown in FIG. 8, in some aspects, process 800 may include determining that one or more CSI reports are scheduled to be transmitted in a same time slot as a first uplink resource for a HARQ-ACK for the downlink communication (block 820). For example, the UE (e.g., using determination component 1208, depicted in FIG. 12) may determine that one or more CSI reports are scheduled to be transmitted in a same time slot as a first uplink resource for a HARQ-ACK for the downlink communication, as described above.

As further shown in FIG. 8, in some aspects, process 800 may include determining whether a second uplink resource for multiplexing the one or more CSI reports is in a same sub-slot as the first uplink resource (block 830). For example, the UE (e.g., using determination component 1208, depicted in FIG. 12) may determine whether a second uplink resource for multiplexing the one or more CSI reports is in a same sub-slot as the first uplink resource, as described above.

As further shown in FIG. 8, in some aspects, process 800 may include transmitting the HARQ-ACK for the downlink communication on the first uplink resource in connection with a determination that the second uplink resource is not in the same sub-slot as the first uplink resource (block 840). For example, the UE (e.g., using transmission component 1204, depicted in FIG. 12) may transmit the HARQ-ACK for the downlink communication on the first uplink resource in connection with a determination that the second uplink resource is not in the same sub-slot as the first uplink resource, as described above.

Process 800 may include additional aspects, such as any single aspect or any combination of aspects described below and/or in connection with one or more other processes described elsewhere herein.

In a first aspect, the downlink communication is a semi-persistent scheduling physical downlink shared channel communication.

In a second aspect, alone or in combination with the first aspect, the first uplink resource is a first physical uplink control channel resource and the second uplink resource is a second physical uplink control channel resource.

In a third aspect, alone or in combination with one or more of the first and second aspects, transmitting the HARQ-ACK for the downlink communication on the first uplink resource comprises transmitting the HARQ-ACK for the downlink communication on the first uplink resource without multiplexing the HARQ-ACK for the downlink communication with the one or more CSI reports.

In a fourth aspect, alone or in combination with one or more of the first through third aspects, transmitting the HARQ-ACK for the downlink communication on the first uplink resource comprises transmitting the HARQ-ACK for the downlink communication on the first uplink resource without transmitting the one or more CSI reports in a sub-slot of the same time slot as the first uplink resource.

In a fifth aspect, alone or in combination with one or more of the first through fourth aspects, transmitting the HARQ-ACK for the downlink communication on the first uplink resource comprises transmitting the HARQ-ACK for the downlink communication on the first uplink resource in a first sub-slot.

In a sixth aspect, alone or in combination with one or more of the first through fifth aspects, process 800 includes multiplexing the one or more CSI reports on the second uplink resource, and transmitting the one or more CSI reports multiplexed on the second uplink resource in a second sub-slot.

In a seventh aspect, alone or in combination with one or more of the first through sixth aspects, process 800 includes multiplexing the HARQ-ACK with the one or more CSI reports on the second uplink resource in connection with a determination that the second uplink resource is in the same sub-slot as the first uplink resource.

In an eighth aspect, alone or in combination with one or more of the first through seventh aspects, process 800 includes, prior to receiving the downlink communication, receiving a configuration identifying the first uplink resource and the second uplink resource.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
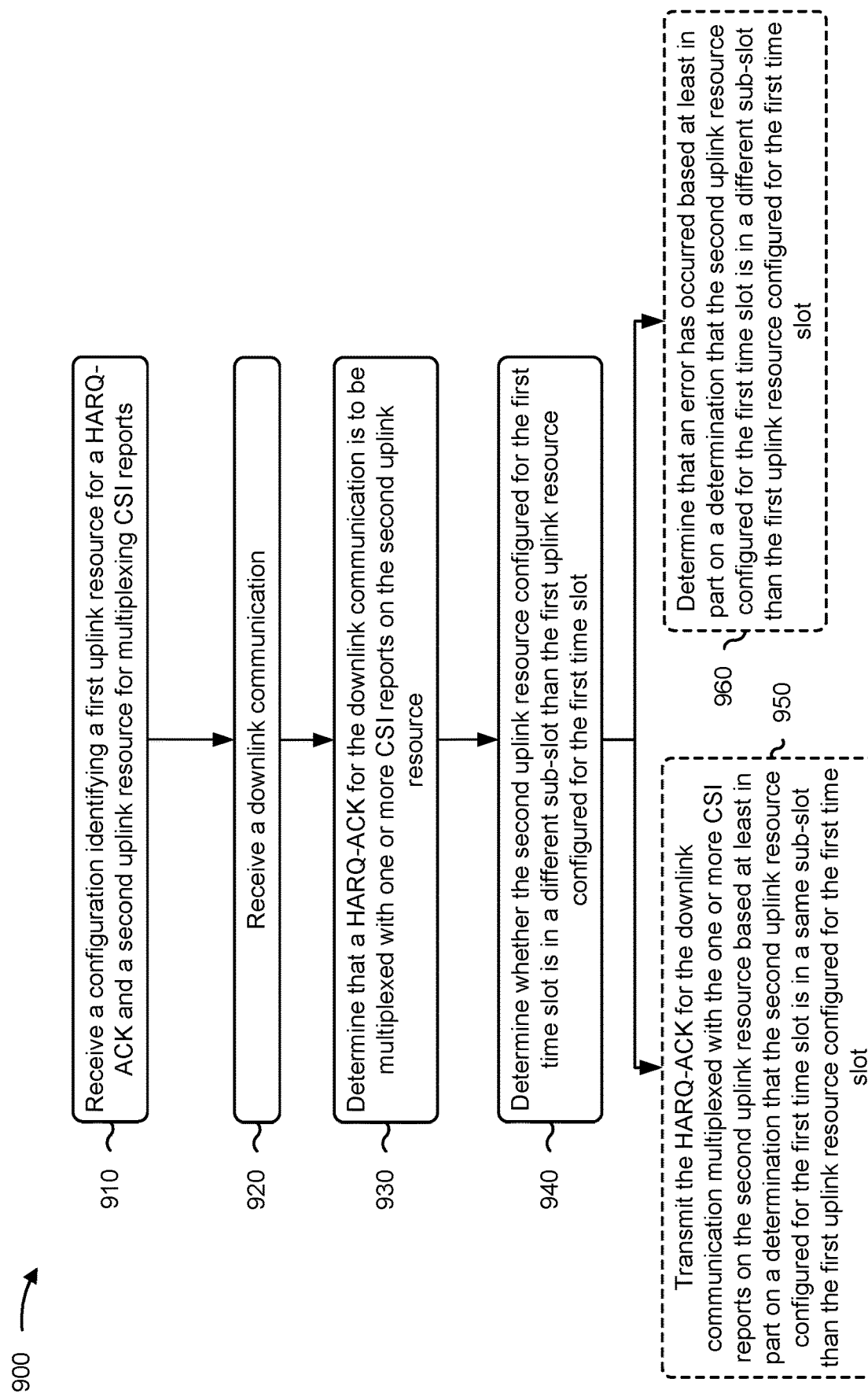

FIG. 9 is a diagram illustrating an example process 900 performed, for example, by a UE, in accordance with the present disclosure. Example process 900 is an example where the UE (e.g., UE 120) performs operations associated with multiplexing of a sub-slot based HARQ-ACK and slot based CSI.

As shown in FIG. 9, in some aspects, process 900 may include receiving a configuration identifying, for at least a time slot, a first uplink resource for a HARQ-ACK and a second uplink resource for multiplexing CSI reports (block 910). For example, the UE (e.g., using reception component 1202, depicted in FIG. 12) may receive a configuration identifying, for at least a time slot, a first uplink resource for a HARQ-ACK and a second uplink resource for multiplexing CSI reports, as described above.

As further shown in FIG. 9, in some aspects, process 900 may include receiving a downlink communication (block 920). For example, the UE (e.g., using reception component 1202, depicted in FIG. 12) may receive a downlink communication, as described above.

As further shown in FIG. 9, in some aspects, process 900 may include determining that a HARQ-ACK for the downlink communication is to be multiplexed with one or more CSI reports on the second uplink resource configured for the time slot (block 930). For example, the UE (e.g., using determination component 1208, depicted in FIG. 12) may determine that a HARQ-ACK for the downlink communication is to be multiplexed with one or more CSI reports on the second uplink resource configured for the time slot, as described above.

As further shown in FIG. 9, in some aspects, process 900 may include determining whether the second uplink resource configured for the time slot is in a different sub-slot than the first uplink resource configured for the time slot (block 940). For example, the UE (e.g., using determination component 1208, depicted in FIG. 12) may determine whether the second uplink resource configured for the time slot is in a different sub-slot than the first uplink resource configured for the time slot, as described above.

As further shown in FIG. 9, in some aspects, process 900 may include transmitting the HARQ-ACK for the downlink communication multiplexed with the one or more CSI reports on the second uplink resource based at least in part on a determination that the second uplink resource configured for the time slot is in a same sub-slot as the first uplink resource configured for the time slot (block 950). For example, the UE (e.g., using transmission component 1204, depicted in FIG. 12) may transmit the HARQ-ACK for the downlink communication multiplexed with the one or more CSI reports on the second uplink resource based at least in part on a determination that the second uplink resource configured for the time slot is in a same sub-slot as the first uplink resource configured for the time slot.

As further shown in FIG. 9, in some aspects, process 900 may include determining that an error has occurred based at least in part on a determination that the second uplink resource configured for the time slot is in a different sub-slot than the first uplink resource configured for the time slot (block 960). For example, the UE (e.g., using determination component 1208, depicted in FIG. 12) may determine that an error has occurred based at least in part on a determination that the second uplink resource configured for the time slot is in a different sub-slot than the first uplink resource configured for the time slot.

Process 900 may include additional aspects, such as any single aspect or any combination of aspects described below and/or in connection with one or more other processes described elsewhere herein.

In a first aspect, determining that the error has occurred includes determining that multiplexing the HARQ-ACK with the one or more CSI reports on the second uplink resource moves the HARQ-ACK from a first sub-slot to a second sub-slot, and transmitting the HARQ-ACK for the downlink communication multiplexed with the one or more CSI reports on the second uplink resource in the second sub-slot.

In a second aspect, determining that the error has occurred includes determining that multiplexing the HARQ-ACK with the one or more CSI reports on the second uplink resource moves the HARQ-ACK from a first sub-slot to a second sub-slot, and transmitting the HARQ-ACK for the downlink communication on the first uplink resource in the first sub-slot.

In a third aspect, determining that the error has occurred includes determining that multiplexing the HARQ-ACK with the one or more CSI reports on the second uplink resource moves the HARQ-ACK from a first sub-slot to a second sub-slot, and refrain from transmitting the HARQ-ACK for the downlink communication.

In a fourth aspect, alone or in combination with one or more of the first through third aspects, the downlink communication is a semi-persistent scheduling physical downlink shared channel communication.

In a fifth aspect, alone or in combination with one or more of the first through fourth aspects, the first uplink resource is a first physical uplink control channel resource and the second uplink resource is a second physical uplink control channel resource.

In a sixth aspect, alone or in combination with one or more of the first through fifth aspects, the configuration is a radio resource control configuration.

In a seventh aspect, alone or in combination with one or more of the first through sixth aspects, the error is one of a configuration error or a scheduling error.

In an eighth aspect, alone or in combination with one or more of the first through seventh aspects, determining that the HARQ-ACK for the downlink communication is to be multiplexed with the one or more CSI reports on the second uplink resource configured in the first time slot includes determining that the first uplink resource for the HARQ-ACK overlaps with an uplink resource for at least one CSI report of the one or more CSI reports.

In a ninth aspect, alone or in combination with one or more of the first through eighth aspects, determining that the error has occurred includes determining that the error has occurred based at least in part on a determination that the UE is configured with sub-slot based HARQ-ACK reporting and based at least in part on the determination that the second uplink resource configured for the time slot is in the different sub-slot than the first uplink resource configured for the time slot.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
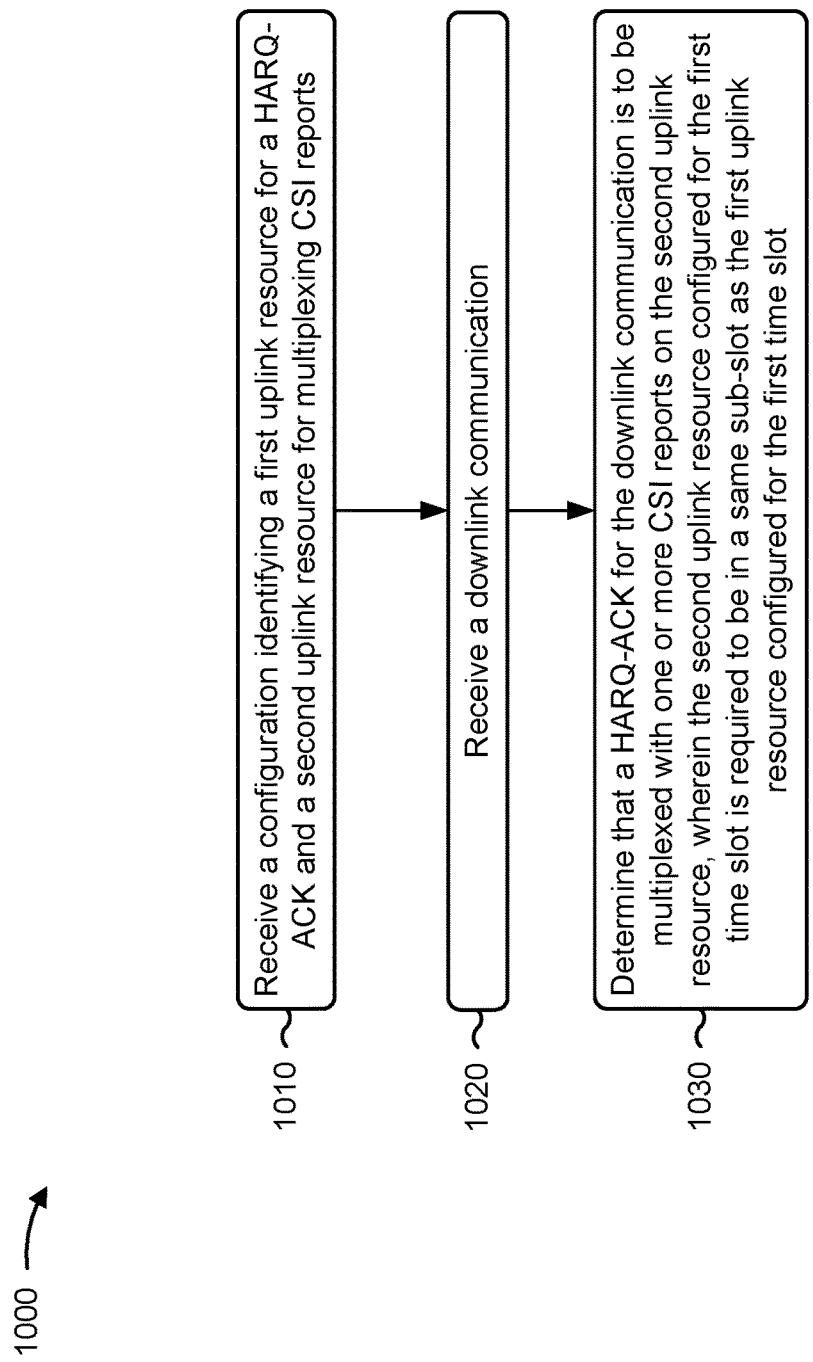

FIG. 10 is a diagram illustrating an example process 1000 performed, for example, by a UE, in accordance with the present disclosure. Example process 1000 is an example where the UE (e.g., UE 120) performs operations associated with multiplexing of sub-slot based HARQ-ACK and slot based CSI.

As shown in FIG. 10, in some aspects, process 1000 may include receiving a configuration identifying, for at least a time slot, a first uplink resource for a HARQ-ACK and a second uplink resource for multiplexing CSI reports (block 1010). For example, the UE (e.g., using reception component 1202, depicted in FIG. 12) may receive a configuration identifying, for at least a time slot, a first uplink resource for a HARQ-ACK and a second uplink resource for multiplexing CSI reports, as described above.

As further shown in FIG. 10, in some aspects, process 1000 may include receiving a downlink communication (block 1020). For example, the UE (e.g., using reception component 1202, depicted in FIG. 12) may receive a downlink communication, as described above.

As further shown in FIG. 10, in some aspects, process 1000 may include determining that a HARQ-ACK for the downlink communication is to be multiplexed with one or more CSI reports on the second uplink resource configured for the time slot, wherein the second uplink resource configured for the time slot is required to be in a same sub-slot as the first uplink resource configured for the time slot (block 1030). For example, the UE (e.g., using determination component 1208, depicted in FIG. 12) may determine that a HARQ-ACK for the downlink communication is to be multiplexed with one or more CSI reports slot on the second uplink resource configured for the time slot, wherein the second uplink resource configured for the time slot is required to be in a same sub-slot as the first uplink resource configured for the time slot, as described above.

Process 1000 may include additional aspects, such as any single aspect or any combination of aspects described below and/or in connection with one or more other processes described elsewhere herein.

In a first aspect, determining that the HARQ-ACK for the downlink communication is to be multiplexed with the one or more CSI reports on the second uplink resource configured in the time slot comprises determining that the uplink resource for the HARQ-ACK overlaps with an uplink resource for at least one CSI report of the one or more CSI reports.

In a second aspect, alone or in combination with the first aspect, process 1000 includes transmitting the HARQ-ACK for the downlink communication multiplexed with the one or more CSI reports on the second uplink resource.

In a third aspect, alone or in combination with one or more of the first and second aspects, the downlink communication is a semi-persistent scheduling physical downlink shared channel communication.

In a fourth aspect, alone or in combination with one or more of the first through third aspects, the first uplink resource is a first physical uplink control channel resource and the second uplink resource is a second physical uplink control channel resource.

In a fifth aspect, alone or in combination with one or more of the first through fourth aspects, the configuration is a radio resource control configuration.

In a sixth aspect, alone or in combination with one or more of the first through fifth aspects, the UE is configured for sub-slot based HARQ-ACK reporting.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
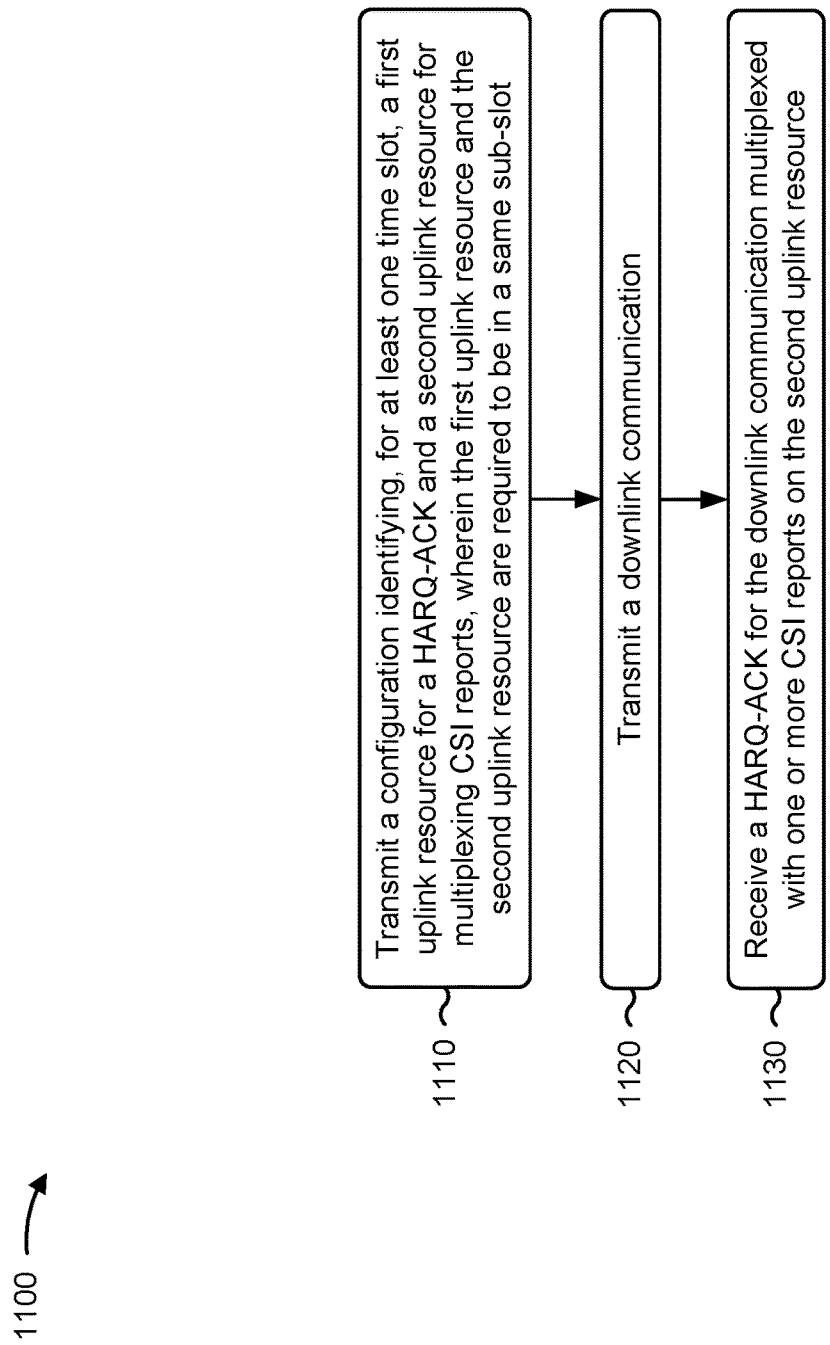

FIG. 11 is a diagram illustrating an example process 1100 performed, for example, by a base station, in accordance with the present disclosure. Example process 1100 is an example where the base station (e.g., base station 110) performs operations associated with multiplexing of a sub-slot based HARQ-ACK and slot based CSI.

As shown in FIG. 11, in some aspects, process 1100 may include transmitting, to a UE, a configuration identifying, for at least one time slot, a first uplink resource for a HARQ-ACK and a second uplink resource for multiplexing CSI reports, wherein the first uplink resource and the second uplink resource are required to be in a same sub-slot (block 1110). For example, the base station (e.g., using transmission component 1304, depicted in FIG. 13) may transmit, to a UE, a configuration identifying, for at least one time slot, a first uplink resource for a HARQ-ACK and a second uplink resource for multiplexing CSI reports, wherein the first uplink resource and the second uplink resource are in a same sub-slot, as described above.

As further shown in FIG. 11, in some aspects, process 1100 may include transmitting, to the UE, a downlink communication (block 1120). For example, the base station (e.g., using transmission component 1304, depicted in FIG. 13) may transmit, to the UE, a downlink communication, as described above.

As further shown in FIG. 11, in some aspects, process 1100 may include receiving, from the UE, a HARQ-ACK for the downlink communication multiplexed with one or more CSI reports on the second uplink resource (block 1130). For example, the base station (e.g., using reception component 1302, depicted in FIG. 1300) may receive, from the UE, a HARQ-ACK for the downlink communication multiplexed with one or more CSI reports on the second uplink resource, as described above.

Process 1100 may include additional aspects, such as any single aspect or any combination of aspects described below and/or in connection with one or more other processes described elsewhere herein.

In a first aspect, the downlink communication is a semi-persistent scheduling physical downlink shared channel communication.

In a second aspect, alone or in combination with the first aspect, the first uplink resource is a first physical uplink control channel resource and the second uplink resource is a second physical uplink control channel resource.

In a third aspect, alone or in combination with one or more of the first and second aspects, the configuration is a radio resource control configuration.

In a fourth aspect, alone or in combination with one or more of the first through third aspects, the UE is configured for sub-slot based HARQ-ACK reporting.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
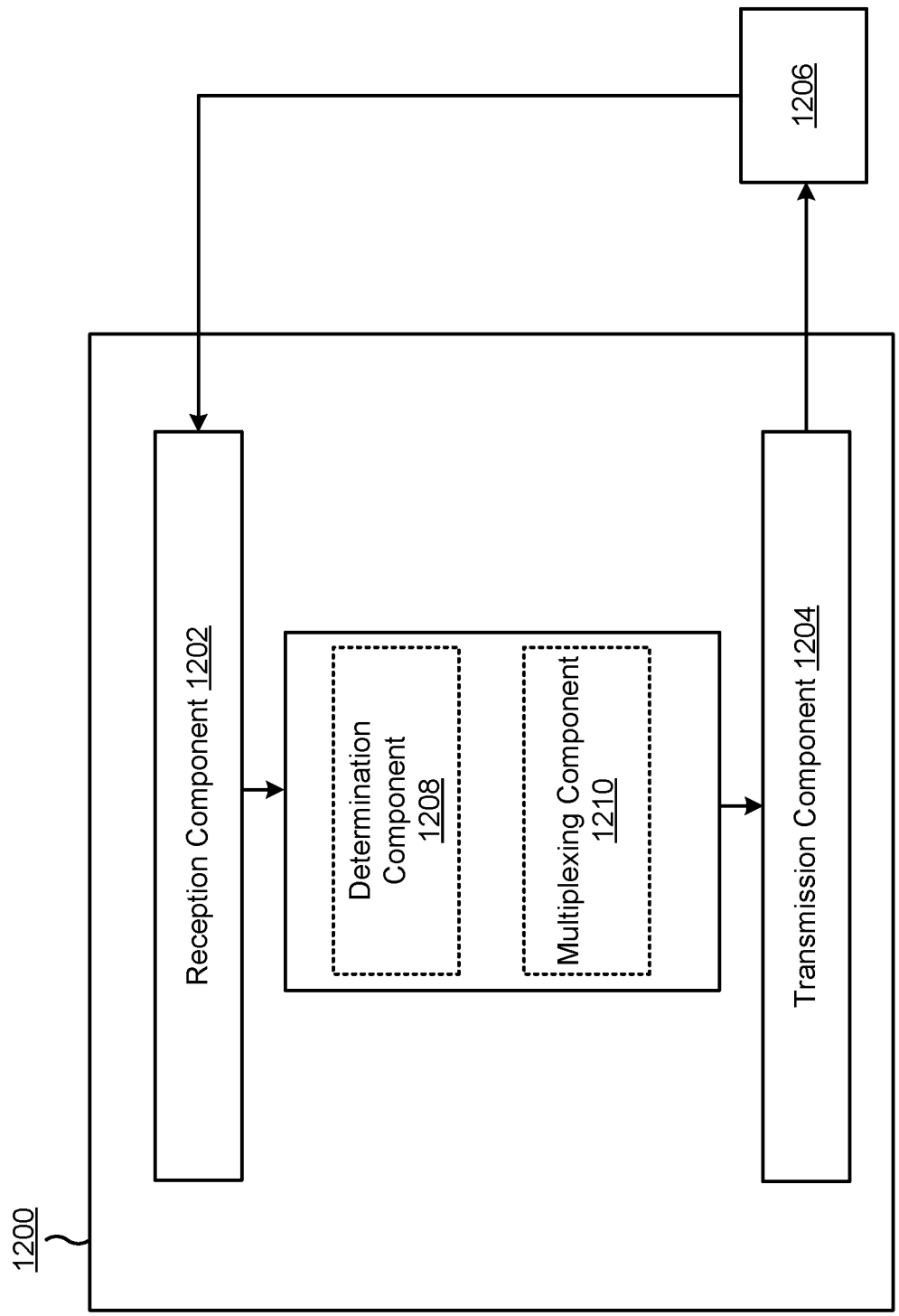
FIGS. 12-13 are block diagrams of example apparatuses for wireless communication, in accordance with the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a determination component 1208 or a multiplexing component 1210, among other examples.

In some aspects, the apparatus 1200 may be configured to perform one or more operations described herein in connection with FIGS. 6-7. Additionally, or alternatively, the apparatus 1200 may be configured to perform one or more processes described herein, such as process 800 of FIG. 8, process 900 of FIG. 9, process 1000 of FIG. 10, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The reception component 1202 may receive a downlink communication. The determination component 1208 may determine that one or more CSI reports are scheduled to be transmitted in a same time slot as a first uplink resource for a HARQ-ACK for the downlink communication. In some aspects, the determination component 1208 may include a controller/processor, a memory, or a combination thereof, of the UE described above in connection with FIG. 2. The determination component 1208 may determine whether a second uplink resource for multiplexing the one or more CSI reports is in a same sub-slot as the first uplink resource. The transmission component 1204 may transmit the HARQ-ACK for the downlink communication on the first uplink resource in connection with a determination that the second uplink resource is not in the same sub-slot as the first uplink resource.

The multiplexing component 1210 may multiplex the one or more CSI reports on the second uplink resource. In some aspects, the multiplexing component 1210 may include a modulator, a transmit MIMO processor, a transmit processor, a controller/processor, a memory, or a combination thereof, of the UE described above in connection with FIG. 2.

The transmission component 1204 may transmit the one or more CSI reports multiplexed on the second uplink resource in a second sub-slot.

The multiplexing component 1210 may multiplex the HARQ-ACK with the one or more CSI reports on the second uplink resource in connection with a determination that the second uplink resource is in the same sub-slot as the first uplink resource.

The reception component 1202 may receive a configuration identifying the first uplink resource and the second uplink resource. The reception component 1202 may receive a configuration identifying, for at least a time slot, a first uplink resource for a HARQ-ACK and a second uplink resource for multiplexing CSI reports. The reception component 1202 may receive a downlink communication.

The determination component 1208 may determine that a HARQ-ACK for the downlink communication is to be multiplexed with one or more CSI reports on the second uplink resource configured for the time slot. The determination component 1208 may determine whether the second uplink resource configured for the time slot is in a different sub-slot than the first uplink resource configured for the time slot.

The transmission component 1204 may transmit the HARQ-ACK for the downlink communication multiplexed with one or more CSI reports on the second uplink resource based at least in part on a determination that the second uplink resource configured for the time slot is in a same sub-slot as the first uplink resource configured for the time slot.

The determination component 1208 may determine that an error has occurred based at least in part on a determination that the second uplink resource configured for the time slot is in a different sub-slot than the first uplink resource configured for the time slot.

The reception component 1202 may receive a configuration identifying, for at least a time slot, a first uplink resource for a HARQ-ACK and a second uplink resource for multiplexing CSI reports. The reception component 1202 may receive a downlink communication.

The determination component 1208 may determine that a HARQ-ACK for the downlink communication is to be multiplexed with one or more CSI reports on the second uplink resource configured for the time slot, wherein the second uplink resource configured for the time slot is required to be in a same sub-slot as the first uplink resource configured for the time slot.

The transmission component 1204 may transmit the HARQ-ACK for the downlink communication multiplexed with the one or more CSI reports on the second uplink resource.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
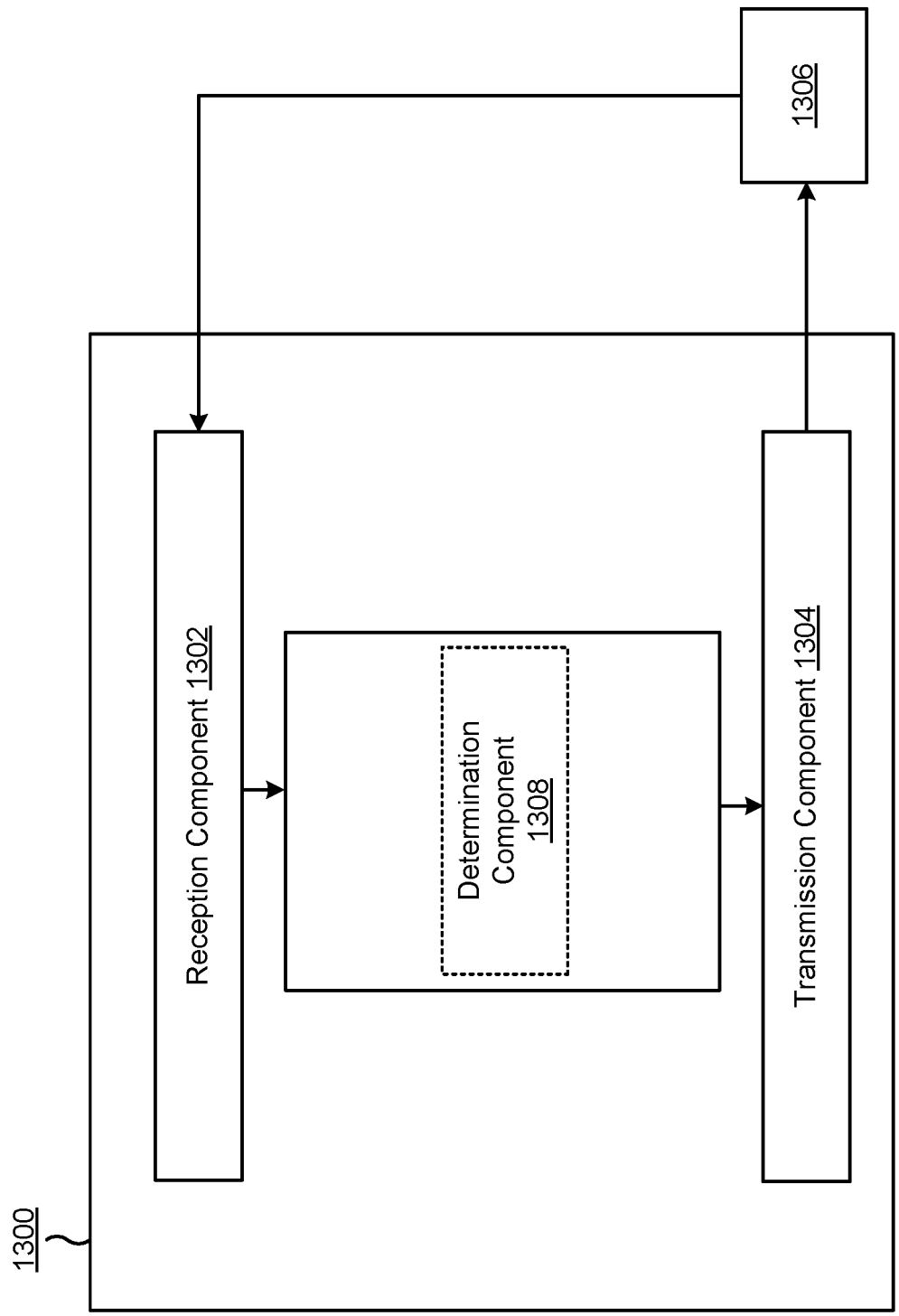

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a determination component 1308, among one or more other examples.

In some aspects, the apparatus 1300 may be configured to perform one or more operations described herein in connection with FIGS. 6-7. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The transmission component 1304 may transmit, to a UE, a configuration identifying, for at least one time slot, a first uplink resource for a HARQ-ACK and a second uplink resource for multiplexing CSI reports, wherein the first uplink resource and the second uplink resource are required to be in a same sub-slot. The determination component 1308 may determine the configuration identifying the first uplink resource and the second uplink resource. In some aspects, the determination component 1308 may include a controller/processor, a memory, or a combination thereof, of the base station described above in connection with FIG. 2. The transmission component 1304 may transmit, to the UE, a downlink communication. The reception component 1302 may receive, from the UE, a HARQ-ACK for the downlink communication multiplexed with one or more CSI reports on the second uplink resource.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving a downlink communication; determining that one or more channel state information (CSI) reports are scheduled to be transmitted in a same time slot as a first uplink resource for a hybrid automatic repeat request acknowledgement (HARQ-ACK) for the downlink communication; determining whether a second uplink resource for multiplexing the one or more CSI reports is in a same sub-slot as the first uplink resource; and transmitting the HARQ-ACK for the downlink communication on the first uplink resource in connection with a determination that the second uplink resource is not in the same sub-slot as the first uplink resource.

Aspect 2: The method of Aspect 1, wherein the downlink communication is a semi-persistent scheduling physical downlink shared channel communication.

Aspect 3: The method of any of Aspects 1-2, wherein the first uplink resource is a first physical uplink control channel resource and the second uplink resource is a second physical uplink control channel resource.

Aspect 4: The method of any of Aspects 1-3, wherein transmitting the HARQ-ACK for the downlink communication on the first uplink resource comprises: transmitting the HARQ-ACK for the downlink communication on the first uplink resource without multiplexing the HARQ-ACK for the downlink communication with the one or more CSI reports.

Aspect 5: The method of any of Aspects 1-4, wherein transmitting the HARQ-ACK for the downlink communication on the first uplink resource comprises: transmitting the HARQ-ACK for the downlink communication on the first uplink resource without transmitting the one or more CSI reports in a sub-slot of the same time slot as the first uplink resource.

Aspect 6: The method of any of Aspects 1-5, wherein transmitting the HARQ-ACK for the downlink communication on the first uplink resource comprises: transmitting the HARQ-ACK for the downlink communication on the first uplink resource in a first sub-slot.

Aspect 7: The method of Aspect 6, further comprising, in connection with the determination that the second uplink resource is not in the same sub-slot as the first uplink resource: multiplexing the one or more CSI reports on the second uplink resource; and transmitting the one or more CSI reports multiplexed on the second uplink resource in a second sub-slot.

Aspect 8: The method of any of Aspects 1-7, further comprising: multiplexing the HARQ-ACK with the one or more CSI reports on the second uplink resource in connection with a determination that the second uplink resource is in the same sub-slot as the first uplink resource.

Aspect 9: The method of any of Aspects 1-8, further comprising, prior to receiving the downlink communication: receiving a configuration identifying the first uplink resource and the second uplink resource.

Aspect 10: A method of wireless communication performed by a user equipment (UE), comprising: receiving a configuration identifying, for at least a time slot, a first uplink resource for a hybrid automatic repeat request acknowledgement (HARQ-ACK) and a second uplink resource for multiplexing channel state information (CSI) reports; receiving a downlink communication; determining that a HARQ-ACK for the downlink communication is to be multiplexed with one or more CSI reports on the second uplink resource configured for the time slot; determining whether the second uplink resource configured for the time slot is in a different sub-slot than the first uplink resource configured for the time slot; and transmitting the HARQ-ACK for the downlink communication multiplexed with the one or more CSI reports on the second uplink resource based at least in part on a determination that the second uplink resource configured for the time slot is in a same sub-slot as the first uplink resource configured for the time slot, or determining that an error has occurred based at least in part on a determination that the second uplink resource configured for the time slot is in a different sub-slot than the first uplink resource configured for the time slot.

Aspect 11: The method of Aspect 10, wherein determining that the error has occurred comprises: determining that multiplexing the HARQ-ACK with the one or more CSI reports on the second uplink resource moves the HARQ-ACK from a first sub-slot to a second sub-slot; and transmitting the HARQ-ACK for the downlink communication multiplexed with the one or more CSI reports on the second uplink resource in the second sub-slot.

Aspect 12: The method of Aspect 10, wherein determining that the error has occurred comprises: determining that multiplexing the HARQ-ACK with the one or more CSI reports on the second uplink resource moves the HARQ-ACK from a first sub-slot to a second sub-slot; and transmitting the HARQ-ACK for the downlink communication on the first uplink resource in the first sub-slot.

Aspect 13: The method of Aspect 10, wherein determining that the error has occurred comprises: determining that multiplexing the HARQ-ACK with the one or more CSI reports on the second uplink resource moves the HARQ-ACK from a first sub-slot to a second sub-slot; and refraining from transmitting the HARQ-ACK for the downlink communication.

Aspect 14: The method of any of Aspects 10-13, wherein determining that the HARQ-ACK for the downlink communication is to be multiplexed with the one or more CSI reports on the second uplink resource configured in the time slot comprises: determining that the first uplink resource for the HARQ-ACK overlaps with an uplink resource for at least one CSI report of the one or more CSI reports.

Aspect 15: The method of any of Aspects 10-14, wherein the downlink communication is a semi-persistent scheduling physical downlink shared channel communication.

Aspect 16: The method of any of Aspects 10-15, wherein the first uplink resource is a first physical uplink control channel resource and the second uplink resource is a second physical uplink control channel resource.

Aspect 17: The method of any of Aspects 10-16, wherein the configuration is a radio resource control configuration.

Aspect 18: The method of any of Aspects 10-17, wherein the error is one of a configuration error or a scheduling error.

Aspect 19: The method of any of Aspects 10-18, wherein determining that the error has occurred comprises: determining that the error has occurred based at least in part on a determination that the UE is configured with sub-slot based HARQ-ACK reporting and based at least in part on the determination that the second uplink resource configured for the time slot is in the different sub-slot than the first uplink resource configured for the time slot.

Aspect 20: A method of wireless communication performed by a user equipment (UE), comprising: receiving a configuration identifying, for at least a time slot, a first uplink resource for a hybrid automatic repeat request acknowledgement (HARQ-ACK) and a second uplink resource for multiplexing channel state information (CSI) reports; receiving a downlink communication; and determining that a HARQ-ACK for the downlink communication is to be multiplexed with one or more CSI reports on the second uplink resource configured for the time slot, wherein the second uplink resource configured for the time slot is required to be in a same sub-slot as the first uplink resource configured for the time slot.

Aspect 21: The method of Aspect 20, wherein determining that the HARQ-ACK for the downlink communication is to be multiplexed with the one or more CSI reports on the second uplink resource configured in the time slot comprises: determining that the first uplink resource for the HARQ-ACK overlaps with an uplink resource for at least one CSI report of the one or more CSI reports.

Aspect 22: The method of any of Aspects 20-21, further comprising: transmitting the HARQ-ACK for the downlink communication multiplexed with the one or more CSI reports on the second uplink resource.

Aspect 23: The method of any of Aspects 20-22, wherein the downlink communication is a semi-persistent scheduling physical downlink shared channel communication.

Aspect 24: The method of any of Aspects 20-23, wherein the first uplink resource is a first physical uplink control channel resource and the second uplink resource is a second physical uplink control channel resource.

Aspect 25: The method of any of Aspects 20-24, wherein the configuration is a radio resource control configuration.

Aspect 26: The method of any of Aspects 20-25, wherein the UE is configured for sub-slot based HARQ-ACK reporting.

Aspect 27: A method of wireless communication performed by a base station, comprising: transmitting, to a user equipment (UE), a configuration identifying, for at least one time slot, a first uplink resource for a hybrid automatic repeat request acknowledgement (HARQ-ACK) and a second uplink resource for multiplexing channel state information (CSI) reports, wherein the first uplink resource and the second uplink resource are required to be in a same sub-slot; transmitting, to the UE, a downlink communication; and receiving, from the UE, a HARQ-ACK for the downlink communication multiplexed with one or more CSI reports on the second uplink resource.

Aspect 28: The method of Aspect 27, wherein the downlink communication is a semi-persistent scheduling physical downlink shared channel communication.

Aspect 29: The method of any of Aspects 27-28, wherein the first uplink resource is a first physical uplink control channel resource and the second uplink resource is a second physical uplink control channel resource.

Aspect 30: The method of any of Aspects 27-29, wherein the configuration is a radio resource control configuration.

Aspect 31: The method of any of Aspects 27-30, wherein the UE is configured for sub-slot based HARQ-ACK reporting.

Aspect 32: An apparatus for wireless communication at a device, comprising a processor; memory coupled with the processor; and instructions stored in the memory and executable by the processor to cause the apparatus to perform the method of one or more of Aspects 1-9.

Aspect 33: An apparatus for wireless communication at a device, comprising a processor; memory coupled with the processor; and instructions stored in the memory and executable by the processor to cause the apparatus to perform the method of one or more of Aspects 10-19.

Aspect 34: An apparatus for wireless communication at a device, comprising a processor; memory coupled with the processor; and instructions stored in the memory and executable by the processor to cause the apparatus to perform the method of one or more of Aspects 20-26.

Aspect 35: An apparatus for wireless communication at a device, comprising a processor; memory coupled with the processor; and instructions stored in the memory and executable by the processor to cause the apparatus to perform the method of one or more of Aspects 27-31.

Aspect 36: A device for wireless communication, comprising a memory and one or more processors coupled to the memory, the one or more processors configured to perform the method of one or more of Aspects 1-9.

Aspect 37: A device for wireless communication, comprising a memory and one or more processors coupled to the memory, the one or more processors configured to perform the method of one or more of Aspects 10-19.

Aspect 38: A device for wireless communication, comprising a memory and one or more processors coupled to the memory, the one or more processors configured to perform the method of one or more of Aspects 20-26.

Aspect 39: A device for wireless communication, comprising a memory and one or more processors coupled to the memory, the one or more processors configured to perform the method of one or more of Aspects 27-31.

Aspect 40: An apparatus for wireless communication, comprising at least one means for performing the method of one or more of Aspects 1-9.

Aspect 41: An apparatus for wireless communication, comprising at least one means for performing the method of one or more of Aspects 10-19.

Aspect 42: An apparatus for wireless communication, comprising at least one means for performing the method of one or more of Aspects 20-26.

Aspect 43: An apparatus for wireless communication, comprising at least one means for performing the method of one or more of Aspects 27-31.

Aspect 44: A non-transitory computer-readable medium storing code for wireless communication, the code comprising instructions executable by a processor to perform the method of one or more of Aspects 1-9.

Aspect 45: A non-transitory computer-readable medium storing code for wireless communication, the code comprising instructions executable by a processor to perform the method of one or more of Aspects 10-19.

Aspect 46: A non-transitory computer-readable medium storing code for wireless communication, the code comprising instructions executable by a processor to perform the method of one or more of Aspects 20-26.

Aspect 47: A non-transitory computer-readable medium storing code for wireless communication, the code comprising instructions executable by a processor to perform the method of one or more of Aspects 27-31.

Aspect 48: A non-transitory computer-readable medium storing a set of instructions for wireless communication, the set of instructions comprising one or more instructions that, when executed by one or more processors of a device, cause the device to perform the method of one or more of Aspects 1-9.

Aspect 49: A non-transitory computer-readable medium storing a set of instructions for wireless communication, the set of instructions comprising one or more instructions that, when executed by one or more processors of a device, cause the device to perform the method of one or more of Aspects 10-19.

Aspect 50: A non-transitory computer-readable medium storing a set of instructions for wireless communication, the set of instructions comprising one or more instructions that, when executed by one or more processors of a device, cause the device to perform the method of one or more of Aspects 20-26.

Aspect 51: A non-transitory computer-readable medium storing a set of instructions for wireless communication, the set of instructions comprising one or more instructions that, when executed by one or more processors of a device, cause the device to perform the method of one or more of Aspects 27-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled to the memory, the one or more processors configured to:
receive a configuration identifying, for a time slot, a first uplink resource for hybrid automatic repeat request acknowledgement (HARQ-ACK) and a second uplink resource for multiplexing channel state information (CSI) reports, the time slot being divided into a quantity of sub-slots;
receive a downlink communication associated with reporting HARQ-ACK in the first uplink resource; and
determine that an error has occurred based at least in part on a determination that the second uplink resource configured for the time slot is in a different sub-slot than the first uplink resource configured for the time slot.

2. The UE of claim 1, wherein the one or more processors, to determine that the error has occurred, are configured to:
determine that multiplexing the HARQ-ACK with one or more CSI reports on the second uplink resource moves the HARQ-ACK from a first sub-slot to a second sub-slot.

3. The UE of claim 2, wherein the one or more processors are further configured to:
transmit the HARQ-ACK for the downlink communication on the first uplink resource in the first sub-slot.

4. The UE of claim 2, wherein the one or more processors are further configured to:
refrain from transmitting the HARQ-ACK for the downlink communication.

5. The UE of claim 1, wherein the one or more processors are further configured to:
determine that the HARQ-ACK for the downlink communication is to be multiplexed with one or more CSI reports on the second uplink resource configured in the time slot.

6. The UE of claim 1, wherein the downlink communication is a semi-persistent scheduling physical downlink shared channel communication.

7. The UE of claim 1, wherein the first uplink resource is a first physical uplink control channel resource and the second uplink resource is a second physical uplink control channel resource.

8. The UE of claim 1, wherein the configuration is a radio resource control configuration.

9. The UE of claim 1, wherein the error is one of a configuration error or a scheduling error.

10. The UE of claim 1, wherein the one or more processors, to determine that the error has occurred, are configured to:
determine that the error has occurred based at least in part on a determination that the UE is configured with sub-slot based HARQ-ACK reporting and based at least in part on the determination that the second uplink resource configured for the time slot is in the different sub-slot than the first uplink resource configured for the time slot.

11. A method of wireless communication performed by a user equipment (UE), comprising:
receiving a configuration identifying, for a time slot, a first uplink resource for hybrid automatic repeat request acknowledgement (HARQ-ACK) and a second uplink resource for multiplexing channel state information (CSI) reports, the time slot being divided into a quantity of sub-slots;
receiving a downlink communication associated with reporting HARQ-ACK in the first uplink resource; and
determining that an error has occurred based at least in part on a determination that the second uplink resource configured for the time slot is in a different sub-slot than the first uplink resource configured for the time slot.

12. The method of claim 11, wherein determining that the error has occurred comprises:
determining that multiplexing the HARQ-ACK with one or more CSI reports on the second uplink resource moves the HARQ-ACK from a first sub-slot to a second sub-slot.

13. The method of claim 12, further comprising:
transmitting the HARQ-ACK for the downlink communication on the first uplink resource in the first sub-slot.

14. The method of claim 12, further comprising:
refraining from transmitting the HARQ-ACK for the downlink communication.

15. The method of claim 11, further comprising:
determining that the HARQ-ACK for the downlink communication is to be multiplexed with one or more CSI reports scheduled on the second uplink resource configured in the time slot.

16. The method of claim 11, wherein the downlink communication is a semi-persistent scheduling physical downlink shared channel communication.

17. The method of claim 11, wherein the first uplink resource is a first physical uplink control channel resource and the second uplink resource is a second physical uplink control channel resource.

18. The method of claim 11, wherein the error is one of a configuration error or a scheduling error.

19. The method of claim 11, wherein determining that the error has occurred comprises:
determining that the error has occurred based at least in part on a determination that the UE is configured with sub-slot based HARQ-ACK reporting and based at least in part on the determination that the second uplink resource configured for the time slot is in the different sub-slot than the first uplink resource configured for the time slot.

20. The method of claim 11, wherein the configuration is a radio resource control configuration.

21. A non-transitory computer-readable medium storing a set of instructions for wireless communication, the set of instructions comprising:
one or more instructions that, when executed by one or more processors of a user equipment (UE), cause the UE to:
receive a configuration identifying, for a time slot, a first uplink resource for hybrid automatic repeat request acknowledgement (HARQ-ACK) and a second uplink resource for multiplexing channel state information (CSI) reports, the time slot being divided into a quantity of sub-slots;
receive a downlink communication associated with reporting HARQ-ACK in the first uplink resource; and
determine that an error has occurred based at least in part on a determination that the second uplink resource configured for the time slot is in a different sub-slot than the first uplink resource configured for the time slot.

22. The non-transitory computer-readable medium of claim 21, wherein the one or more instructions, when executed by the one or more processors to determine that the error has occurred, further cause the UE to:
determine that multiplexing the HARQ-ACK with one or more CSI reports on the second uplink resource moves the HARQ-ACK from a first sub-slot to a second sub-slot.

23. The non-transitory computer-readable medium of claim 22, wherein the one or more instructions, when executed by the one or more processors, further cause the UE to:
transmit the HARQ-ACK for the downlink communication on the first uplink resource in the first sub-slot.

24. The non-transitory computer-readable medium of claim 22, wherein the one or more instructions, when executed by the one or more processors, further cause the UE to:
refrain from transmitting the HARQ-ACK for the downlink communication.

25. The non-transitory computer-readable medium of claim 21, wherein the one or more instructions, when executed by the one or more processors to determine that the error has occurred, further cause the UE to:
determine that the error has occurred based at least in part on a determination that the UE is configured with sub-slot based HARQ-ACK reporting and based at least in part on the determination that the second uplink resource configured for the time slot is in the different sub-slot than the first uplink resource configured for the time slot.

26. An apparatus for wireless communication, comprising:
means for receiving a configuration identifying, for a time slot, a first uplink resource for hybrid automatic repeat request acknowledgement (HARQ-ACK) and a second uplink resource for multiplexing channel state information (CSI) reports, the time slot being divided into a quantity of sub-slots;
means for receiving a downlink communication associated with reporting HARQ-ACK in the first uplink resource; and
means for determining that an error has occurred based at least in part on a determination that the second uplink resource configured for the time slot is in a different sub-slot than the first uplink resource configured for the time slot.

27. The apparatus of claim 26, wherein the means for determining that the error has occurred comprise:
means for determining that multiplexing the HARQ-ACK with one or more CSI reports on the second uplink resource moves the HARQ-ACK from a first sub-slot to a second sub-slot.

28. The apparatus of claim 27, further comprising:
means for transmitting the HARQ-ACK for the downlink communication on the first uplink resource in the first sub-slot.

29. The apparatus of claim 27, further comprising:
means for refraining from transmitting the HARQ-ACK for the downlink communication.

30. The apparatus of claim 26, wherein the means for determining that the error has occurred comprise:
means for determining that the error has occurred based at least in part on a determination that the apparatus is configured with sub-slot based HARQ-ACK reporting and based at least in part on the determination that the second uplink resource configured for the time slot is in the different sub-slot than the first uplink resource configured for the time slot.

* * * * *